US008145216B2

(12) United States Patent
Kim et al.

(10) Patent No.: US 8,145,216 B2
(45) Date of Patent: Mar. 27, 2012

(54) MOBILE TERMINAL AND METHOD OF DISPLAYING CHANNEL THEREIN

(75) Inventors: Mi Sun Kim, Seoul (KR); Sung Chul Yang, Gwanganyeong-si (KR); Tae Jung Kwon, Seoul (KR); Chang Young Park, Seoul (KR); So Yeon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 505 days.

(21) Appl. No.: 12/390,176

(22) Filed: Feb. 20, 2009

(65) Prior Publication Data

US 2009/0280805 A1 Nov. 12, 2009

(30) Foreign Application Priority Data

May 9, 2008 (KR) .................. 10-2008-0043466

(51) Int. Cl.
*H04W 4/00* (2009.01)
(52) U.S. Cl. .................. 455/434; 455/161.1; 455/185.1; 455/435.2; 455/515
(58) Field of Classification Search .............. 455/3.01, 455/3.06, 12.1, 66.1, 160.1, 161.1, 161.3, 455/164.1, 185.1, 434, 515, 550.1, 552.1, 455/556.1, 556.2, 566, 62
See application file for complete search history.

(56) References Cited

U.S. PATENT DOCUMENTS

| | | | | |
|---|---|---|---|---|
| 7,177,640 B2 * | 2/2007 | Lee | ............................... | 455/434 |
| 7,711,314 B2 * | 5/2010 | Schadenko | .................. | 455/3.01 |
| 8,019,274 B2 * | 9/2011 | Kjellberg | ..................... | 455/3.01 |
| 2005/0034174 A1 | 2/2005 | Hatanaka | | |
| 2005/0289592 A1 | 12/2005 | Vermola | | |
| 2006/0095936 A1 | 5/2006 | Kim | | |
| 2007/0039026 A1 * | 2/2007 | Yoon et al. | ..................... | 725/62 |
| 2007/0256101 A1 * | 11/2007 | Kim | ............................... | 725/46 |
| 2007/0263124 A1 * | 11/2007 | Nishi | ............................ | 348/570 |
| 2007/0287379 A1 * | 12/2007 | Matsuura et al. | .............. | 455/39 |
| 2008/0020702 A1 * | 1/2008 | Jendbro et al. | ............... | 455/3.01 |
| 2008/0127276 A1 * | 5/2008 | Kim et al. | ........................ | 725/56 |
| 2008/0172695 A1 * | 7/2008 | Migos et al. | .................... | 725/45 |
| 2008/0222690 A1 * | 9/2008 | Kim | ............................... | 725/110 |
| 2009/0013371 A1 * | 1/2009 | Shibahara | ..................... | 725/134 |
| 2009/0143067 A1 * | 6/2009 | Kim et al. | ..................... | 455/434 |
| 2009/0318143 A1 * | 12/2009 | Kim et al. | ..................... | 455/434 |
| 2011/0009123 A1 * | 1/2011 | Queseth et al. | .............. | 455/450 |

FOREIGN PATENT DOCUMENTS

| | | |
|---|---|---|
| EP | 1 549 069 A1 | 6/2005 |
| EP | 1 923 778 A2 | 5/2008 |
| GB | 2 396 068 A | 6/2004 |
| JP | 2007-336408 A | 12/2007 |
| WO | WO 00/59327 A1 | 10/2000 |
| WO | WO 2007/069116 A2 | 6/2007 |

* cited by examiner

Primary Examiner — Anthony Addy
(74) Attorney, Agent, or Firm — Birch, Stewart, Kolasch & Birch, LLP

(57) ABSTRACT

A mobile terminal including a wireless communication unit configured to scan for available frequency bands, and a controller configured to assign a frequency band identification information to each available frequency band and to assign channel identification information to each channel included in a corresponding available frequency band.

20 Claims, 22 Drawing Sheets

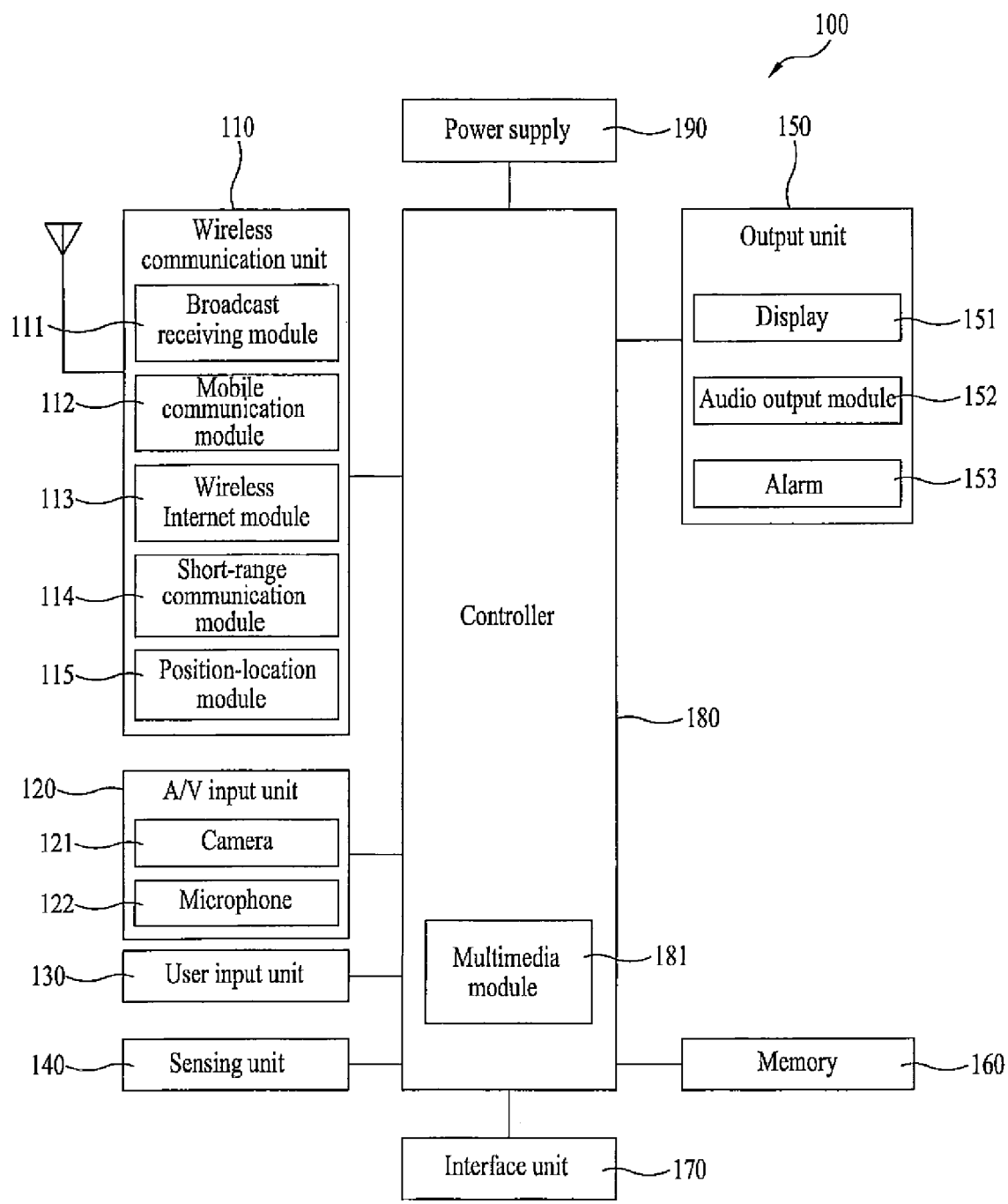

FIG. 6

| Frequency band(MHz) | Mean frequency(MHz) | Channel number 1 | Channel number 2 |
|---|---|---|---|
| 470~478 | 474 | 21 | 1 |
| 478~486 | 482 | 22 | 2 |
| 486~494 | 490 | 23 | 3 |
| 494~502 | 498 | 24 | 4 |
| 502~510 | 506 | 25 | 5 |
| 510~518 | 514 | 26 | 6 |
| 518~526 | 522 | 27 | 7 |
| ⋮ | ⋮ | ⋮ | ⋮ |
| 838~846 | 842 | 67 | 47 |
| 846~854 | 850 | 68 | 48 |
| 854~862 | 858 | 69 | 49 |

FIG. 7A

| | |
|---|---|
| Channel List | |
| 21-1 1st channel | |
| 21-2 2nd channel | |
| 21-3 3rd channel | |
| 23-1 4th channel | |
| 23-2 5th channel | |
| 26-1 6th channel | |
| 26-2 7th channel | |
| 29-1 8th channel | |
| 29-2 9th channel | |
| Menu | OK | Next |

FIG. 7B

| | |
|---|---|
| Channel List | |
| AAA-1 1st channel | |
| AAA-2 2nd channel | |
| AAA-3 3rd channel | |
| BBB-1 4th channel | |
| BBB-2 5th channel | |
| CCC-1 6th channel | |
| CCC-2 7th channel | |
| DDD-1 8th channel | |
| DDD-2 9th channel | |
| Menu | OK | Next |

FIG. 9A
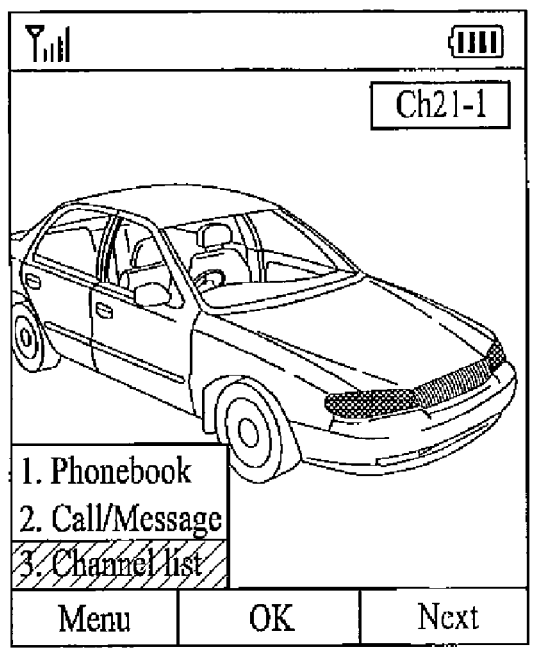
(a)
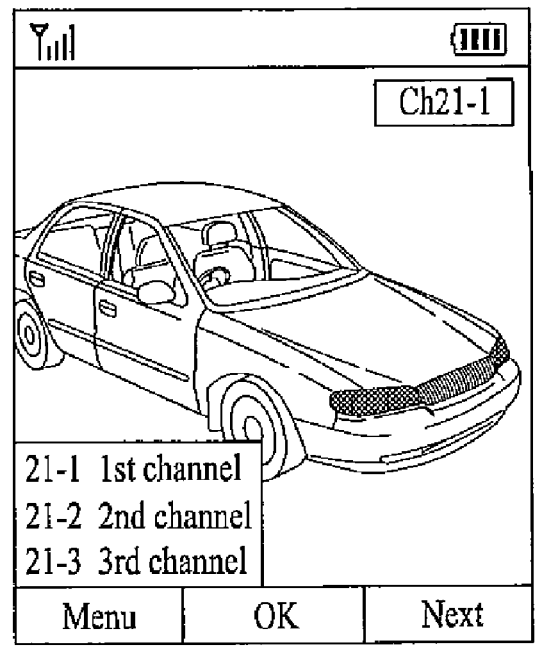
(b)

FIG. 9B
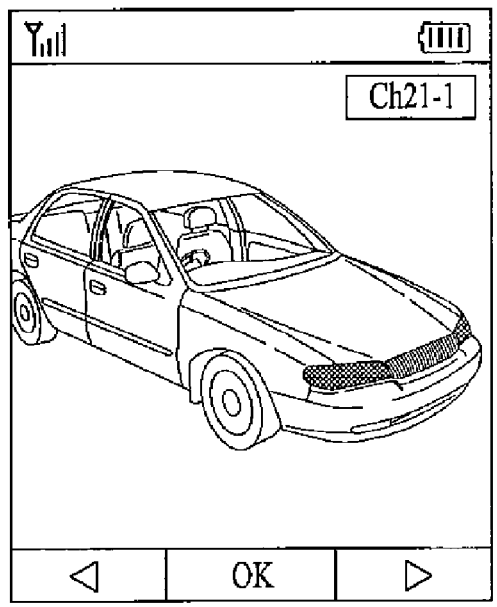
(a)
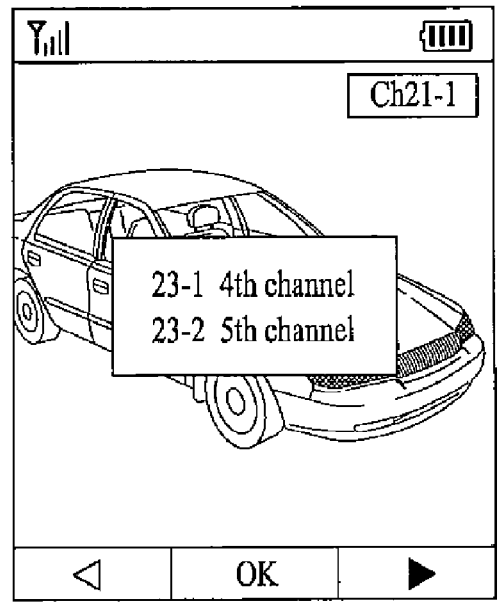
(b)
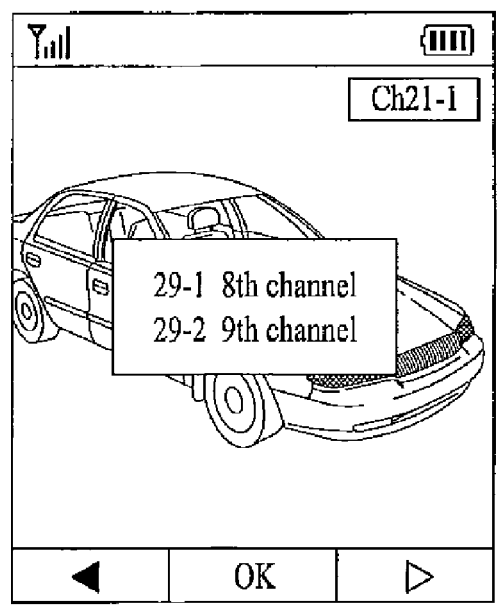
(c)

FIG. 10
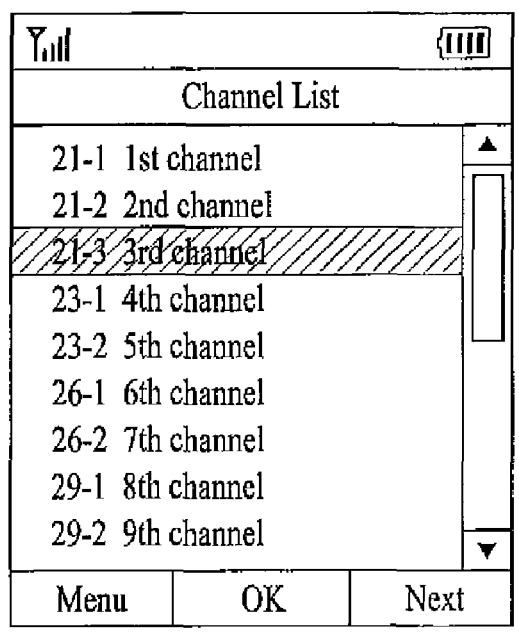
(a)
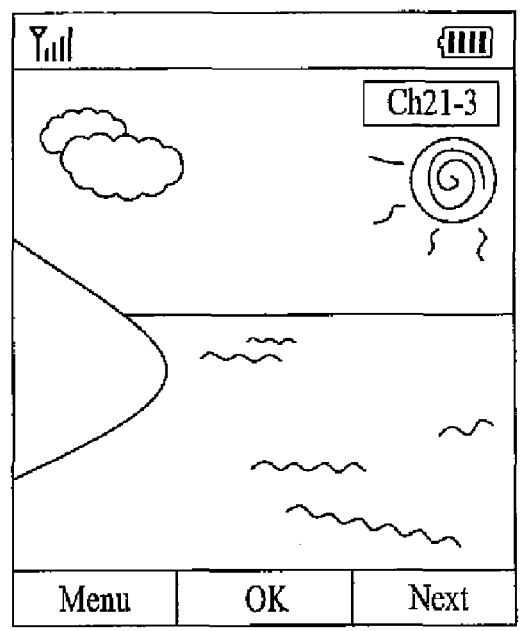
(b)

FIG. 11
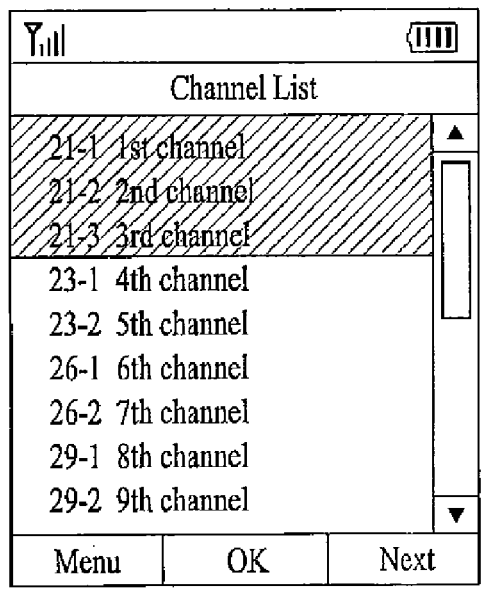
(a)
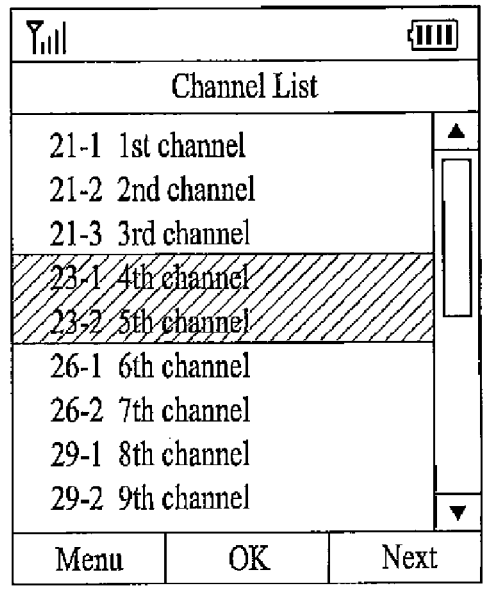
(b)
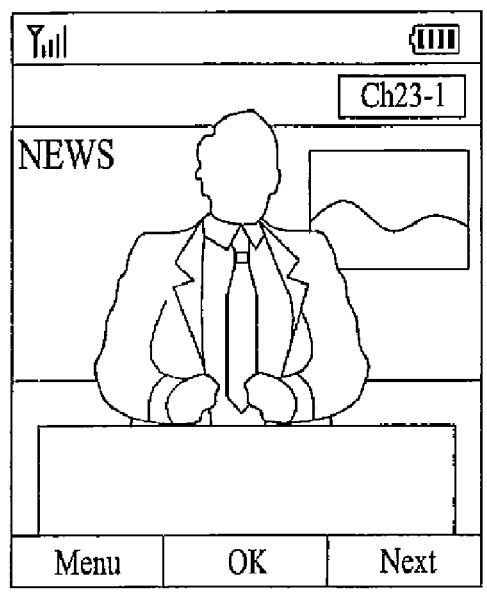
(c)

FIG. 12A
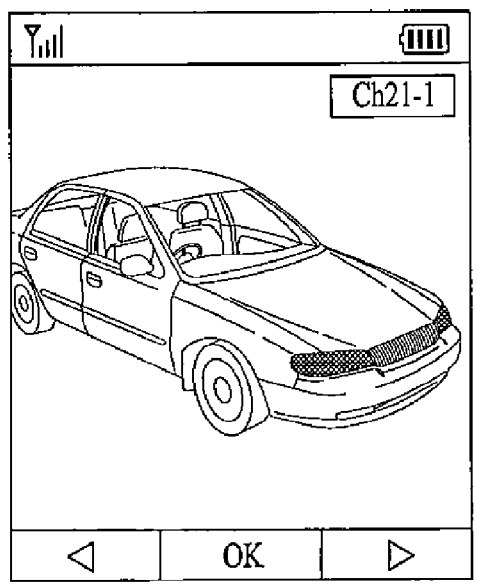
FIG. 12B
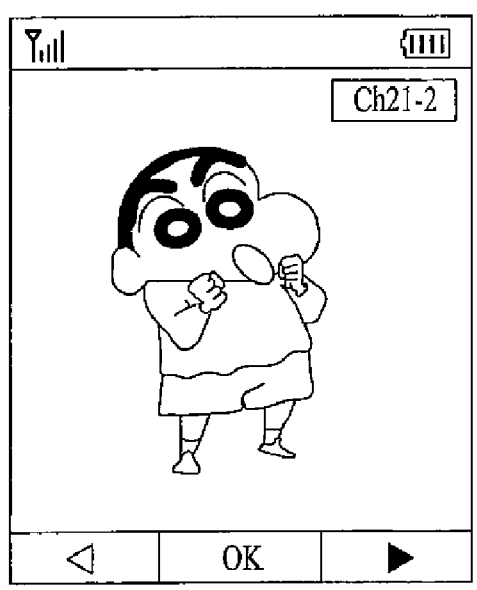   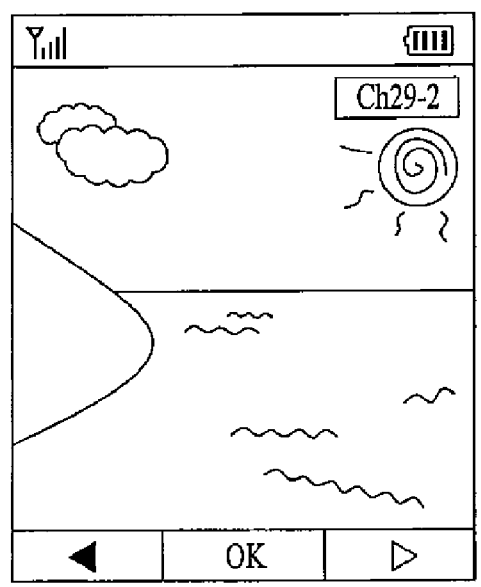
(a)   (b)

FIG. 12C
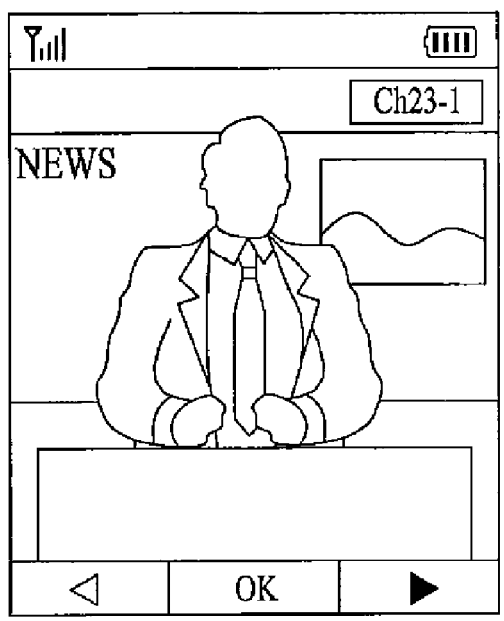
(a)
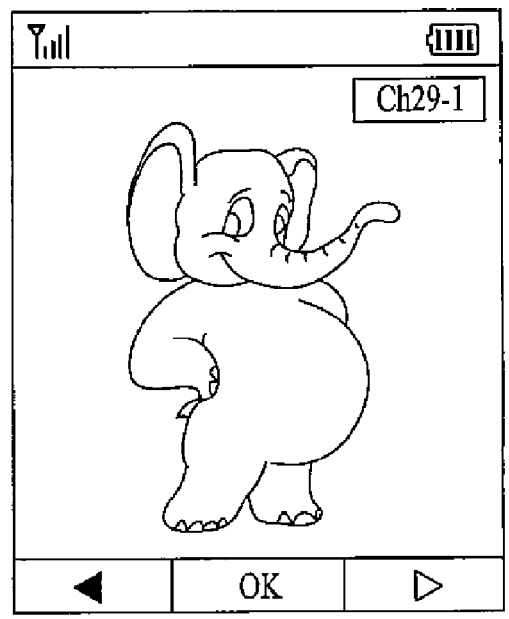
(b)

FIG. 14A
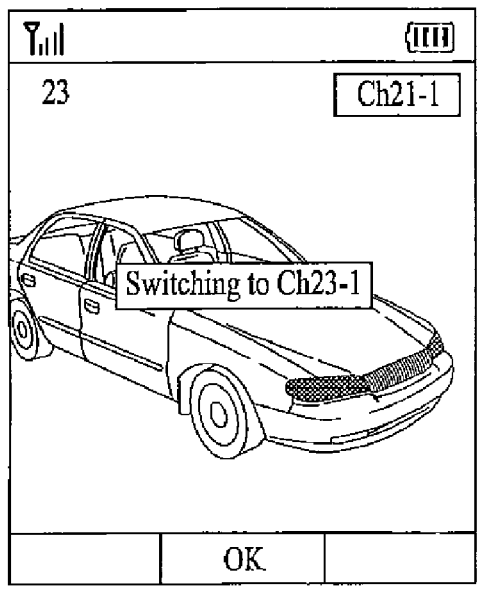 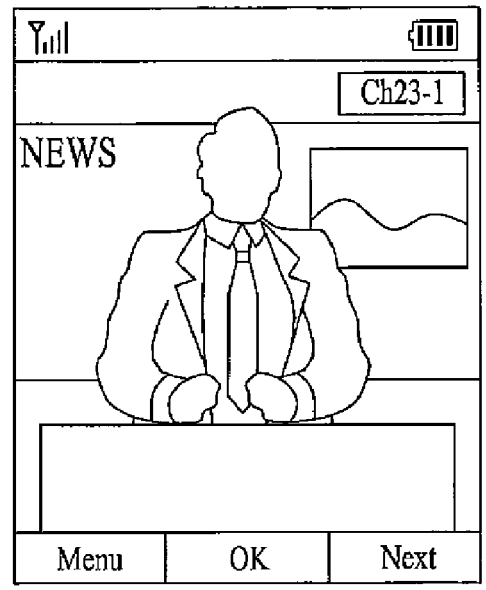
(a)           (b)
FIG. 14B
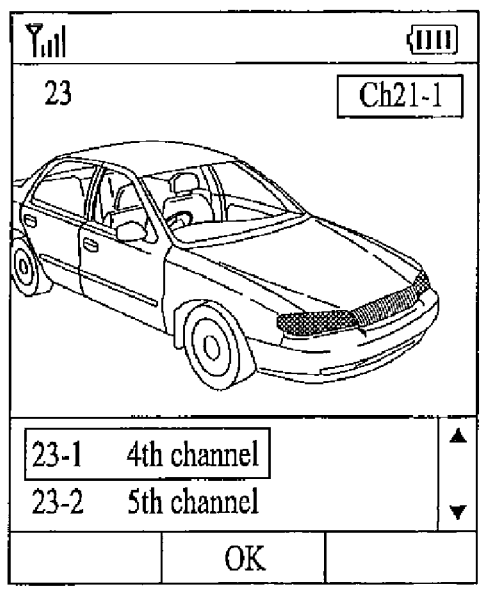 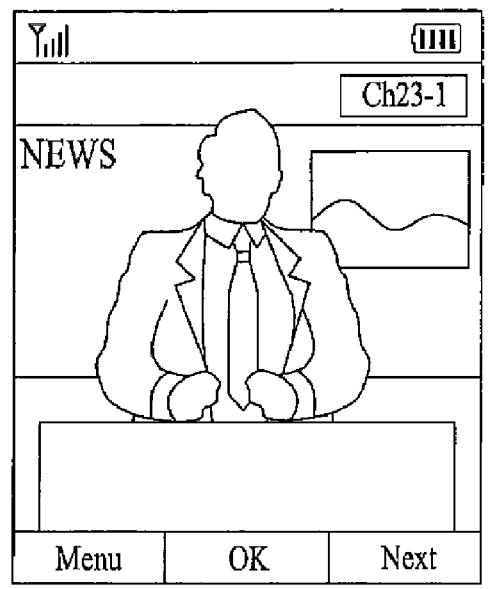
(a)           (b)

FIG. 15
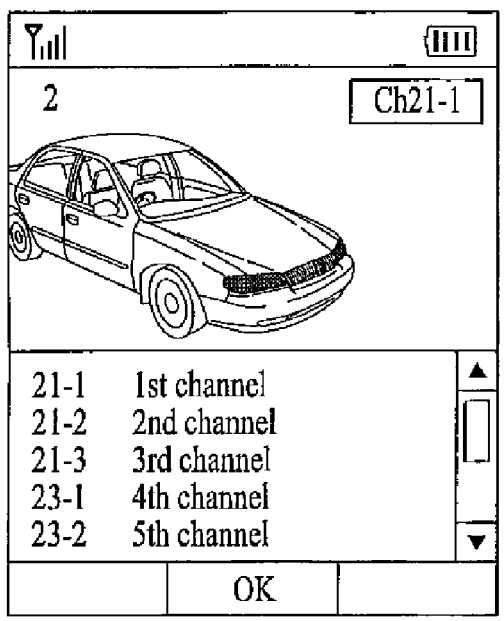
(a)
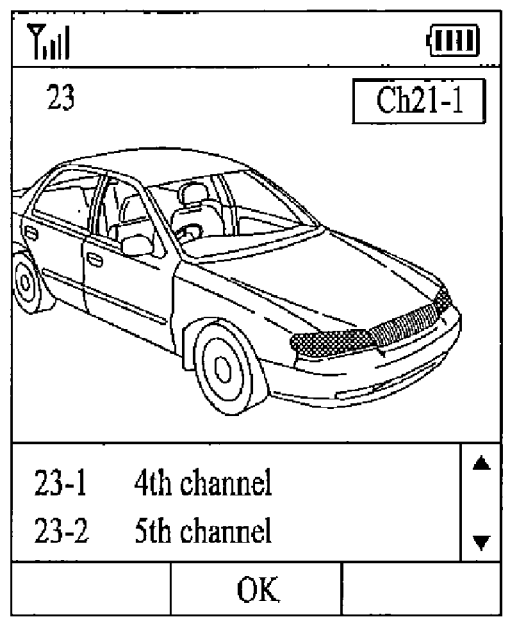
(b)
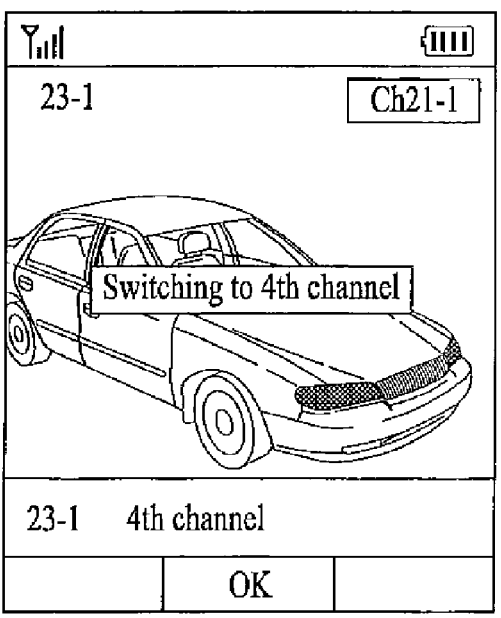
(c)
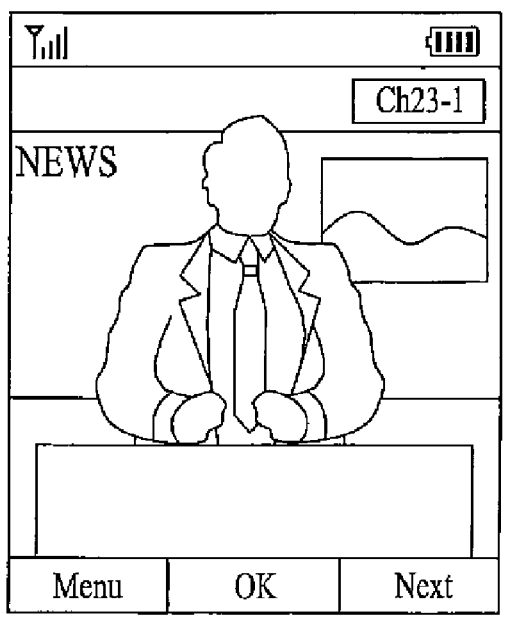
(d)

MOBILE TERMINAL AND METHOD OF DISPLAYING CHANNEL THEREIN

The present application claims the benefit of the Korean Patent Application No. 10-2008-0043466, filed in Korea on May 9, 2008, which is hereby incorporated by reference as if fully set forth herein.

BACKGROUND OF THE INVENTION

1. Field of the Invention

The present invention relates to a mobile terminal and corresponding method of displaying a broadcast channel.

2. Discussion of the Related Art

A mobile terminal is a device which may be configured to perform various functions. Examples of such functions include data and voice communications, capturing images and video via a camera, recording audio, playing music files via a speaker system, and displaying images and video on a display. Some mobile terminals include additional functionality which supports game playing, while other mobile terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components which form the mobile terminal.

In the related art broadcast receiving terminal, after the frequency bands have been fully scanned, random channel numbers are assigned to the scanned frequency bands. The broadcast receiving terminal then displays a channel list having broadcast channel numbers, enters a broadcast channel selected from the channel list, and then receives and outputs a broadcast signal corresponding to the selected broadcast channel.

However, because the user generally moves around with their terminal, the result of the scanning procedure varies depending on the location of the user. Also, each location assigns different channel numbers. In addition, when multiple channels are assigned to a single frequency band, the terminal does not differentiate the multiple channels from each other. Therefore, the user has difficulty in recognizing channels due to the above problems.

SUMMARY OF THE INVENTION

Accordingly, one object of the present invention is to address the above-noted and other drawbacks of the related art.

Another object of the present invention is to provide a mobile terminal and corresponding method of displaying a channel in which the same frequency identification information is granted to channels assigned to the same frequency band.

Another object of the present invention is to provide a mobile terminal and corresponding method in which a plurality of channels assigned to at least one frequency band are displayed in a manner of being identified.

Yet another object of the present invention is to provide a mobile terminal and corresponding method in which a specific channel can be conveniently and quickly selected through a key input.

To achieve these objects and other advantages and in accordance with the purpose of the invention, as embodied and broadly described herein, the present invention provides in one aspect a mobile terminal including a wireless communication unit scanning at least one or more frequency bands and a controller determining whether at least one or more channels are assigned to each of the at least one or more frequency bands, and granting frequency band identification information and channel identification information to each of the at least one or more channels if the at least one or more channels are assigned as a result of the determination.

In another aspect, the present invention provides a method of displaying a channel in a mobile terminal and which includes scanning at least one or more frequency bands, determining whether at least one or more channels are assigned to each of the at least one or more frequency bands according to a result of the scanning step, and granting frequency band identification information and channel identification information to each of the at least one or more channels if the at least one or more channels are assigned as a result of the determining step.

In still another aspect, the present invention provides a mobile terminal including a wireless communication unit configured to scan for available frequency bands, and a controller configured to assign a frequency band identification information to each available frequency band and to assign channel identification information to each channel included in a corresponding available frequency band.

In yet another aspect, the present invention provides a method of controlling a mobile terminal, and which includes scanning for available frequency bands, and assigning a frequency band identification information to each available frequency band and assigning channel identification information to each channel included in a corresponding available frequency band.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a block diagram of a mobile terminal according to an embodiment of the present invention;

FIG. 6 is a table of identification numbers assigned to a frequency band applied to a mobile terminal according to one embodiment of the present invention;

FIGS. 7A to 7E are overviews of display screens illustrating a first screen configuration for displaying a channel list in a mobile terminal according to one embodiment of the present invention;

FIGS. 9A and 9B are overviews of display screens illustrating a screen configuration for displaying a channel list in a mobile terminal in a broadcast outputting mode according to one embodiment of the present invention;

FIGS. 10 and 11 are overviews of display screens illustrating a screen configuration for selecting a channel, and a screen configuration for outputting a broadcast signal provided on the selected channel in a mobile terminal according to one embodiment of the present invention;

FIGS. 12A to 12C are overviews of display screens illustrating a screen configuration for selecting a channel using a navigation key in a broadcast outputting mode, and a screen configuration for displaying an output mode of a broadcast signal provided on the selected channel in a mobile terminal according to one embodiment of the present invention;

FIGS. 14A FIG. 14B are overviews of display screens illustrating a screen configuration for selecting a channel corresponding to an inputted frequency band identification number in a mobile terminal according to one embodiment of the present invention; and FIG. 15 is an overview of a display screen illustrating a screen configuration for selecting a channel corresponding to an input number in a mobile terminal according to one embodiment of the present invention.

DETAILED DESCRIPTION OF THE INVENTION

Figure 2A:
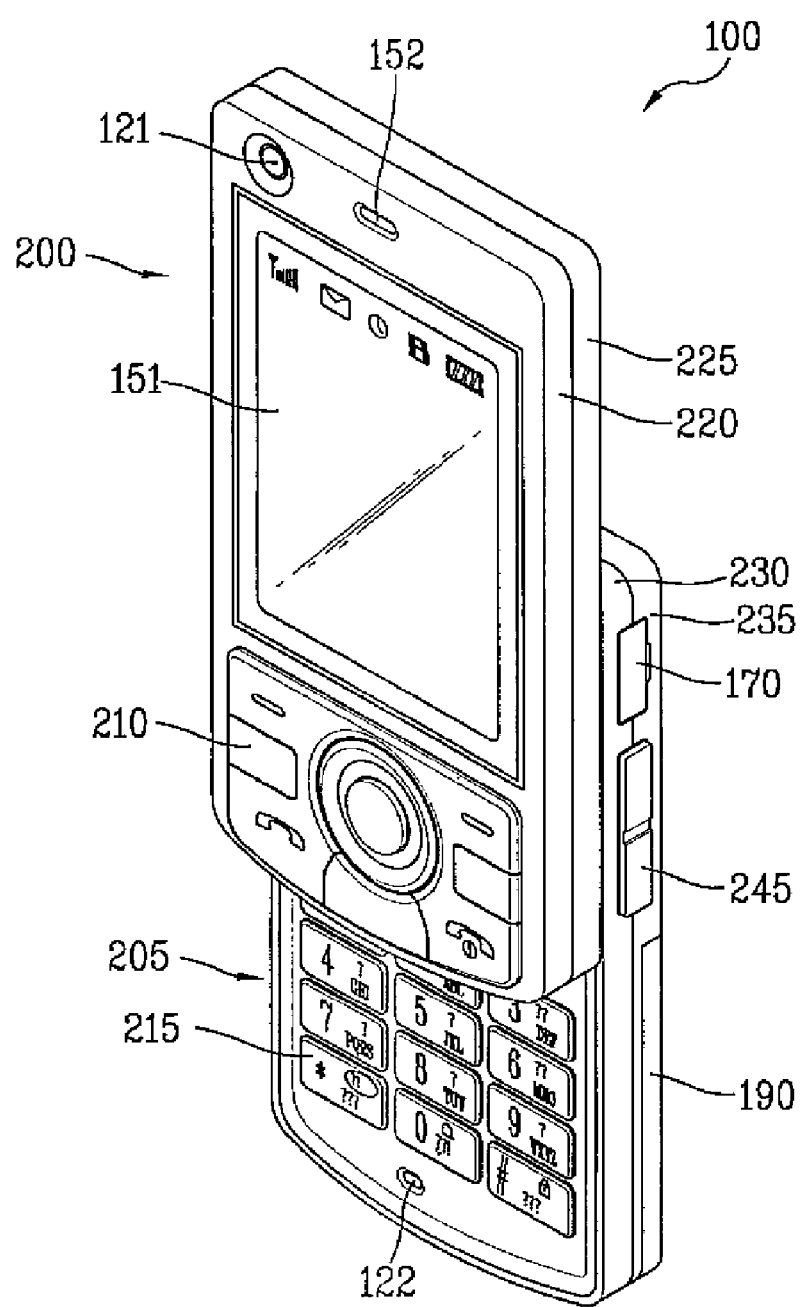
FIG. 2A is a front perspective view of a mobile terminal according to an embodiment of the present invention.

Reference will now be made in detail to the preferred embodiments of the present invention, examples of which are illustrated in the accompanying drawings. It is to be understood by those of ordinary skill in the art that other embodiments may be utilized, and structural, electrical, as well as procedural changes may be made without departing from the scope of the present invention. Wherever possible, the same reference numbers will be used throughout the drawings to refer to the same or like parts.

FIG. 1 is a block diagram of a mobile terminal 100 according to an embodiment of the present invention. The mobile terminal 100 may be implemented using a variety of different types of mobile terminals. Examples of such mobile terminals include mobile phones, user equipment, smart phones, computers, digital broadcast mobile terminals, personal digital assistants, portable multimedia players (PMP) and navigators. By way of a non-limiting example only, further description will be with regard to a mobile terminal. However, such teachings apply equally to other types of mobile terminals. FIG. 1 shows the mobile terminal 100 having various components, but implementing all of the illustrated components is not a requirement. Greater or fewer components may alternatively be implemented.

As shown in FIG. 1, the mobile terminal 100 includes a wireless communication unit 110 configured with several components. For instance, the wireless communication unit 110 includes one or more components which permits wireless communication between the mobile terminal 100 and a wireless communication system or network within which the mobile terminal 100 is located.

For example, a broadcast receiving module 111 receives a broadcast signal and/or broadcast associated information from an external broadcast managing entity via a broadcast channel. The broadcast channel may include a satellite channel and a terrestrial channel. In addition, the broadcast managing entity generally refers to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of the digital multimedia broadcasting (DMB) system and an electronic service guide (ESG) of the digital video broadcast-handheld (DVB-H) system.

The broadcast signal may be implemented as a TV broadcast signal, a radio broadcast signal, and a data broadcast signal, among others. If desired, the broadcast signal may further include a broadcast signal combined with a TV or radio broadcast signal. Also, the broadcast receiving module 111 may be configured to receive broadcast signals transmitted from various types of broadcast systems. In a non-limiting example, such broadcasting systems include the digital multimedia broadcasting-terrestrial (DMB-T) system, the digital multimedia broadcasting-satellite (DMB-S) system, the digital video broadcast-handheld (DVB-H) system, the data broadcasting system known as the media forward link only (MediaFLO®) and the integrated services digital broadcast-terrestrial (TSDB-T) system. Receiving of multicast signals is also possible. Further, data received by the broadcast receiving module 111 may be stored in a suitable device, such as a memory 160.

In addition, a mobile communication module 112 transmits/receives wireless signals to/from one or more network entities (e.g., a base station, a Node-B). Such signals may represent audio, video, multimedia, control signaling, and data, among others. Further, the wireless Internet module 113 supports Internet access for the mobile terminal, and may be internally or externally coupled to the mobile terminal.

Also, a short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

A position-location module 115 identifies or otherwise obtains the location of the mobile terminal 100. In addition, this module may be implemented using global positioning system (GPS) components which cooperate with associated satellites, network components, and combinations thereof. An Audio/video (A/V) input unit 120 is also configured to provide audio or video signal input to the mobile terminal 100. AS shown, the A/V input unit 120 includes a camera 121 and a microphone 122. The camera 121 receives and processes image frames of still pictures or video. Also, two or more microphones 122 and/or cameras 121 may be used.

Further, the microphone 122 receives an external audio signal while the portable device is in a particular mode, such as a phone call mode, a recording mode and voice recognition. The audio signal is then processed and converted into digital data. Also, the portable device, and in particular, the A/V input unit 120, can include assorted noise removing algorithms to remove noise generated in the course of receiving the external audio signal.

In addition, data generated by the A/V input unit 120 may be stored in the memory 160, utilized by an output unit 150, or transmitted via one or more modules in the communication unit 110. A user input unit 130 also generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touchscreen display.

Further, a sensing unit 140 provides status measurements of various aspects of the mobile terminal. For instance, the sensing unit 140 may detect an open/close status of the mobile terminal, a relative positioning of components (e.g., a display and keypad) of the mobile terminal 100, a change of position of the mobile terminal 100 or a component of the mobile terminal 100, a presence or absence of user contact with the mobile terminal 100, an orientation or acceleration/deceleration of the mobile terminal 100, etc.

As an example, when the mobile terminal 100 is configured as a slide-type mobile terminal, the sensing unit 140 may sense whether a sliding portion of the mobile terminal 100 is opened or closed. Other examples include the sensing unit 140 sensing the presence or absence of power provided by a power supply 190, the presence or absence of a coupling or other connection between an interface unit 170 and an external device, etc.

Further, the interface unit 170 is implemented to couple the mobile terminal 100 with external devices such as wired/wireless headphones, external chargers, power supplies, storage devices configured to store data (e.g., audio, video, pictures, etc.), earphones, and microphones, among others. The interface unit 170 may also be configured using a wired/wireless data port, a card socket (e.g., for coupling to a memory card and a device equipped with an identity module), audio input/output ports and video input/output ports.

In this instance, the identity module is a chip that stores various types of information for identifying or authenticating a use or authority of the terminal 100. In addition, the identity module can include one of a user identity module (UIM), a subscriber identity module (SIM), a universal subscriber identity module (USIM) and the like. In particular, the identity module can include a module for identifying or authenticating an authority for a broadcast purchase and/or a broadcast viewing using the terminal 100. An identity device provided with the identity module can be manufactured as a smart card. Thus, the identity device can be connected to the terminal 100 via a port for connecting the identity device.

Further, the output unit 150 generally includes various components which support the output requirements of the mobile terminal 100. For example, a display 151 is implemented to visually display information associated with the mobile terminal 100. For instance, if the mobile terminal 100 is operating in a phone call mode, the display 151 provides a user interface or graphical user interface which includes information associated with placing, conducting, and terminating a phone call. As another example, if the mobile terminal 100 is in a video call mode or a photographing mode, the display 151 may additionally or alternatively display images which are associated with these modes.

One particular implementation includes the display 151 configured as a touch screen working in cooperation with an input device, such as a touchpad. This configuration permits the display 151 to function both as an output device and an input device. Further, the display 151 may be implemented using display technologies including, for example, a liquid crystal display (LCD), a thin film transistor-liquid crystal display (TFT-LCD), an organic light-emitting diode display (OLED), a flexible display, a three-dimensional display and a transparent organic light-emitting diode display (TOLED).

The mobile terminal 100 may also include one or more of such displays. An example of a two-display embodiment is one in which one display is configured as an internal display (viewable when the mobile terminal is in an opened position) and a second display configured as an external display (viewable in both the opened and closed positions).

Further, a proximity sensor can be provided within the touchscreen or around the touch screen, or can be provided within the sensing unit 140. The proximity sensor is a sensor that detects a presence or non-presence of an object approaching a prescribed detecting surface or an object existing around the proximity sensor using an electromagnetic field strength or infrared ray without mechanical contact. Also, the proximity sensor has durability longer than that of a contact type sensor and also has a wider utility than that of the contact type sensor.

In addition, the proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like.

One example of an operational principle of the radio frequency oscillation proximity sensor is explained as follows. First, while an oscillation circuit is oscillating a full-wave radio frequency, and if an object approaches in the vicinity of the sensor detecting surface, an oscillation amplitude of the oscillation circuit attenuates or stops.

Such a variation is then converted into an electric signal to detect a presence or non-presence of the object. Therefore, even if a different substance (except a highly metallic substance) is placed between the radio frequency oscillation proximity sensor and the object, the proximity switch is able to detect a specific object without interference with the different substance.

Also, when the touch screen is an electrostatic type, the proximity sensor can be configured to detect a proximity of a pointer using a variation of an electric field according to the proximity of the pointer. Therefore, if the pointer is located in the vicinity of the touchscreen, but does not contact the touchscreen, the sensor can detect the position of the pointer and the distance between the pointer and the touchscreen.

In the following description, an action corresponding to a pointer approaching but not contacting the touch screen is referred to as a 'proximity touch', and an action that a pointer actually touches the touchscreen is referred to as a 'contact touch'. Further, the position on the touchscreen proximity-touched by the pointer corresponds to the position of the pointer which vertically opposes the touchscreen when the pointer performs the proximity touch.

In addition, the proximity sensor detects a proximity touch and a proximity touch pattern (e.g., a proximity touch distance, a proximity touch duration, a proximity touch position, a proximity touch shift state, etc.). Also, information corresponding to the detected proximity touch action and the detected proximity touch pattern can be output to the touchscreen.

FIG. 1 further shows the output unit 150 having an audio output module 152 which supports the audio output requirements of the mobile terminal 100. The audio output module 152 may be implemented using one or more speakers, buzzers, other audio producing devices, and combinations thereof. The audio output module 152 functions in various modes including a call-receiving mode, a call-placing mode, a recording mode, a voice recognition mode and a broadcast reception mode. During operation of the terminal 100, the audio output module 152 outputs audio relating to a particular function (e.g., call received, message received, and errors)

The output unit 150 also includes an alarm 153, which is used to signal or otherwise identify the occurrence of a particular event associated with the mobile terminal 100. Typical events include a call received, a message received and user input received. An example of such output includes the providing of tactile sensations (e.g., vibration) to a user. For instance, the alarm 153 may be configured to vibrate responsive to the mobile terminal receiving a call or message.

As another example, vibration is provided by the alarm 153 responsive to receiving user input at the mobile terminal 100, thus providing a tactile feedback mechanism. Further, the various output provided by the components of the output unit 150 may be separately performed, or such output may be performed using any combination of such components.

In addition, the memory 160 is used to store various types of data to support the processing, control, and storage requirements of the mobile terminal 100. Examples of such data include program instructions for applications operating on the mobile terminal 100, contact data, phonebook data, messages, pictures, video, etc. The memory 160 shown in FIG. 1 may be implemented using any type (or combination) of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The controller 180 also controls the overall operations of the mobile terminal 100. For instance, the controller 180 performs the control and processing associated with voice calls, data communications, video calls, camera operations and recording operations. If desired, the controller may include a multimedia module 181 which provides multimedia playback. The multimedia module 181 may be configured as part of the controller 180, or may be implemented as a separate component.

In addition, the controller 180 is able to perform pattern recognition processing for recognizing a handwriting input performed on the touchscreen as a character or recognizing a picture drawing input performed on the touchscreen as an image. The power supply 190 provides power required by the various components for the portable device. The provided power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, the memory 160), and executed by a controller or processor (for example, the controller 180).

In addition, the terminal 100 may be implemented in a variety of different configurations. Examples of such configurations include a folder-type, slide-type, bar-type, rotational-type, swing-type and combinations thereof. The following description refers primarily to a slide-type mobile terminal. However, such teachings apply equally to other types of mobile terminals.

Next, FIG. 2A is a front perspective view of a mobile terminal according to an embodiment of the present invention. In FIG. 2A, the mobile terminal 100 is shown having a first body 200 configured to slideably cooperate with a second body 205. Further, the user input unit 130 (described in FIG. 1) is implemented using function keys 210 and keypad 215. The function keys 210 are associated with the first body 200, and the keypad 215 is associated with the second body 205. In addition, the keypad 215 includes various keys (e.g., numbers, characters, and symbols) to enable a user to place a call, prepare a text or multimedia message, and otherwise operate the mobile terminal 100. The first body 200 slides relative to the second body 205 between opened and closed positions. In a closed position, the first body 200 is positioned over the second body 205 in such a manner that the keypad 215 is substantially or completely obscured by the first body 200. In the opened position, a user can access the keypad 215, as well as the display 151 and the function keys 210. The function keys 210 are convenient to a user for entering commands such as start, stop and scroll.

In addition, the mobile terminal 100 is operable in either a standby mode (e.g., able to receive a call or message, receive and respond to network control signaling, etc.), or an active call mode. The mobile terminal 100 generally functions in a standby mode when in the closed position, and an active mode when in the opened position. This mode configuration may be changed as required or desired.

Further, the first body 200 is shown formed from a first case 220 and a second case 225, and the second body 205 is shown formed from a first case 230 and a second case 235. The first and second cases can be formed using a suitably ridge material such as injection molded plastic, or formed using a metallic material such as stainless steel (STS) and titanium (Ti). Also, one or more intermediate cases may be provided between the first and second cases of one or both of the first and second bodies 200, 205. The first and second bodies 200, 205 are also sized to receive electronic components necessary to support operation of the mobile terminal 100.

In addition, the first body 200 is shown having the camera 121 and the audio output unit 152, which is configured as a speaker, positioned relative to the display 151. Also, the camera 121 may be constructed in such a manner that it can be selectively positioned (e.g., rotated, swiveled, etc.) relative to first body 200.

Further, the function keys 210 are positioned adjacent to a lower side of the display 151, which is shown implemented as an LCD or OLED. As discussed above, the display 151 may also be configured as a touchscreen having an underlying touchpad which generates signals responsive to user contact (e.g., a finger, a stylus, etc.) with the touchscreen.

In addition, the second body 205 is shown having the microphone 122 positioned adjacent to the keypad 215, and the side keys 245, which are one type of a user input unit, positioned along the side of the second body 205. Preferably, the side keys 245 are configured as hot keys, such that the side keys 245 are associated with a particular function of the mobile terminal 100. The interface unit 170 is also shown positioned adjacent to the side keys 245, and the power supply 190 in a form of a battery is located on a lower portion of the second body 205.

Figure 2B:
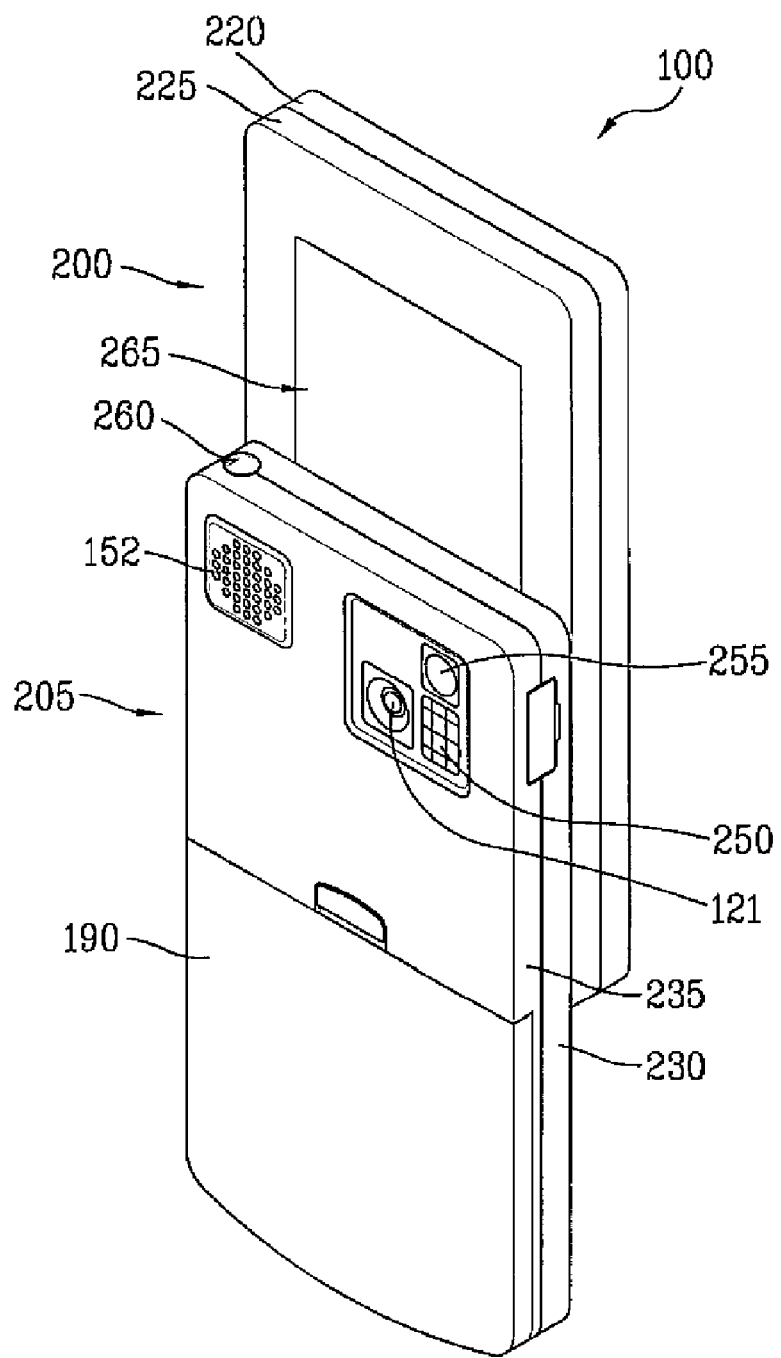
FIG. 2B is a rear perspective view of the mobile terminal shown in FIG. 2A.

Next, FIG. 2B is a rear view of the mobile terminal shown in FIG. 2A. FIG. 2B shows the second body 205 having another camera 121, and an associated flash 250 and a mirror 255. The flash 250 operates in conjunction with the camera 121 of the second body 205, and the mirror 255 is useful for assisting a user to position the camera 121 in a self-portrait mode. Further, the camera 121 of the second body 205 faces a direction which is opposite to a direction faced by the camera 121 of the first body 200 (FIG. 2A). Each of the cameras 121 of the first and second bodies 200, 205 may have the same or different capabilities.

In one embodiment, the camera of the first body 200 operates with a relatively lower resolution than the camera of the second body 205. Such an arrangement works well during a video conference, for example, in which the reverse link bandwidth capabilities may be limited. In addition, the relatively higher resolution of the camera of the second body 205 (FIG. 2B) is useful for obtaining higher quality pictures for later use or for communicating to others.

The second body 205 also includes another audio output module 152 configured as a speaker, and which is located on an upper side of the second body 205. Thus, the audio output modules of the first and second bodies 200, 205 may cooperate to provide stereo output. Moreover, either or both of these audio output modules 152 may be configured to operate as a speakerphone.

In addition, a broadcast signal receiving antenna 260 is shown located at an upper end of the second body 205. The antenna 260 functions in cooperation with the broadcast receiving module 111 (FIG. 1), and may be fixed or configured to retract into the second body 205. Further, the rear side of the first body 200 includes a slide module 265, which slideably couples with a corresponding slide module located on the front side of the second body 205.

It is understood that the illustrated arrangement of the various components of the first and second bodies 200, 205 may be modified as required or desired. For example, some or all of the components of one body may alternatively be implemented on the other body. In addition, the location and relative positioning of such components are not critical to many embodiments, and as such, the components may be positioned at locations which differ from those shown by the representative figures.

Figure 3A:
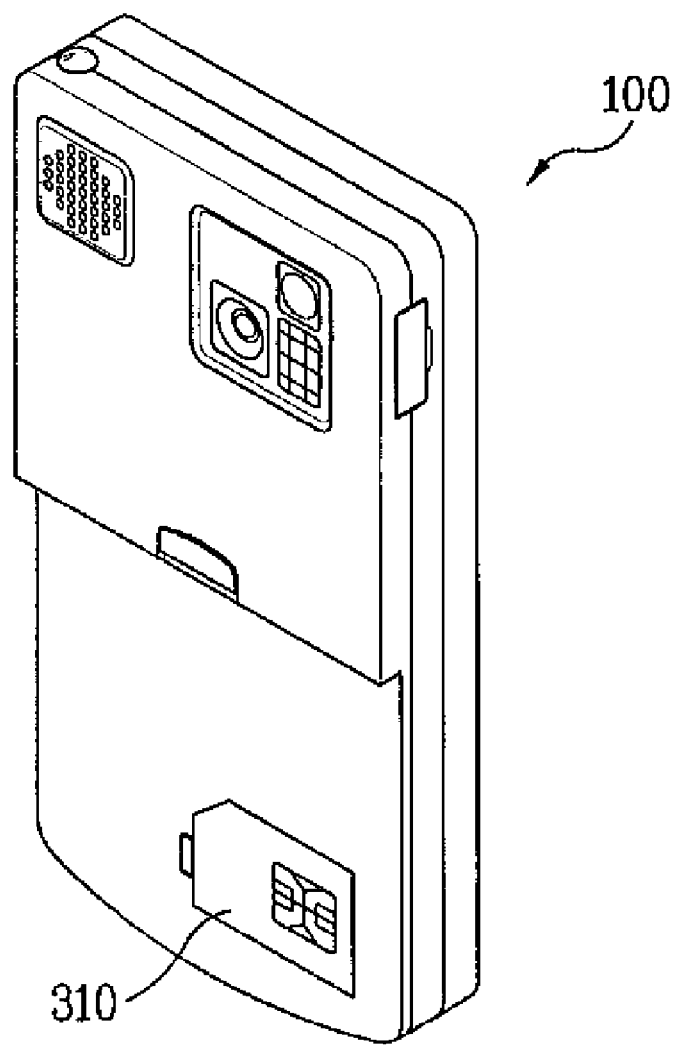
FIGS. 3A and 3B are perspective diagrams representing an identity device that is detached from a terminal according to one embodiment of the present invention.
Figure 3B:
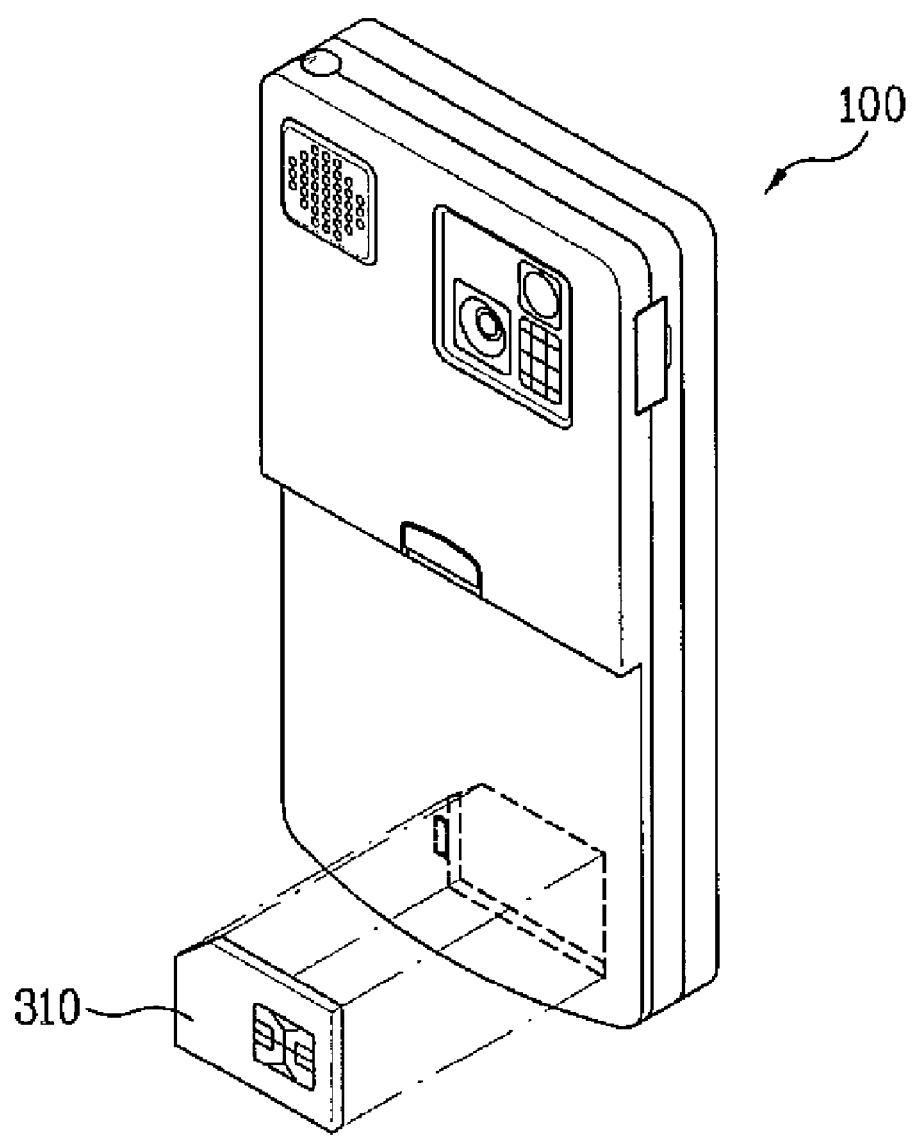

Next, FIGS. 3A and 3B are perspective diagrams for representing an identity device 310 that is detached from a mobile terminal 100 according to one embodiment of the present invention. Further, the identity device 310 can include an SIM card for example.

Referring to FIGS. 3A and 3B, the identity device 310 is detachably provided to the mobile terminal 100. Hence, a new identity device can be loaded in the mobile terminal 100 by replacing an old identity device. Optionally, the identity device 310 can be loaded in the mobile terminal 100 by being combined with the interface unit 170. Alternatively, the identity device 310 can be provided to the mobile terminal 100 by being connected to a connector separately provided for the connection with the identity device 310. In addition, a connecting mechanism for connecting the identity device 310 and the mobile terminal 100 together can be provided to any one of backside, lateral sides, a front side and the like of the mobile terminal 100.

In addition, the mobile terminal 100 shown in FIGS. 1-3B can be configured to operate in a wire/wireless communication system, a satellite based communication system or a communication system capable of transmitting data carried on frames or packets. The mobile terminal 100 of FIGS. 1-3B may also be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include, for example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of a non-limiting example only, the following description relates to a CDMA communication system, but such teachings apply equally to other system types.

Figure 4:
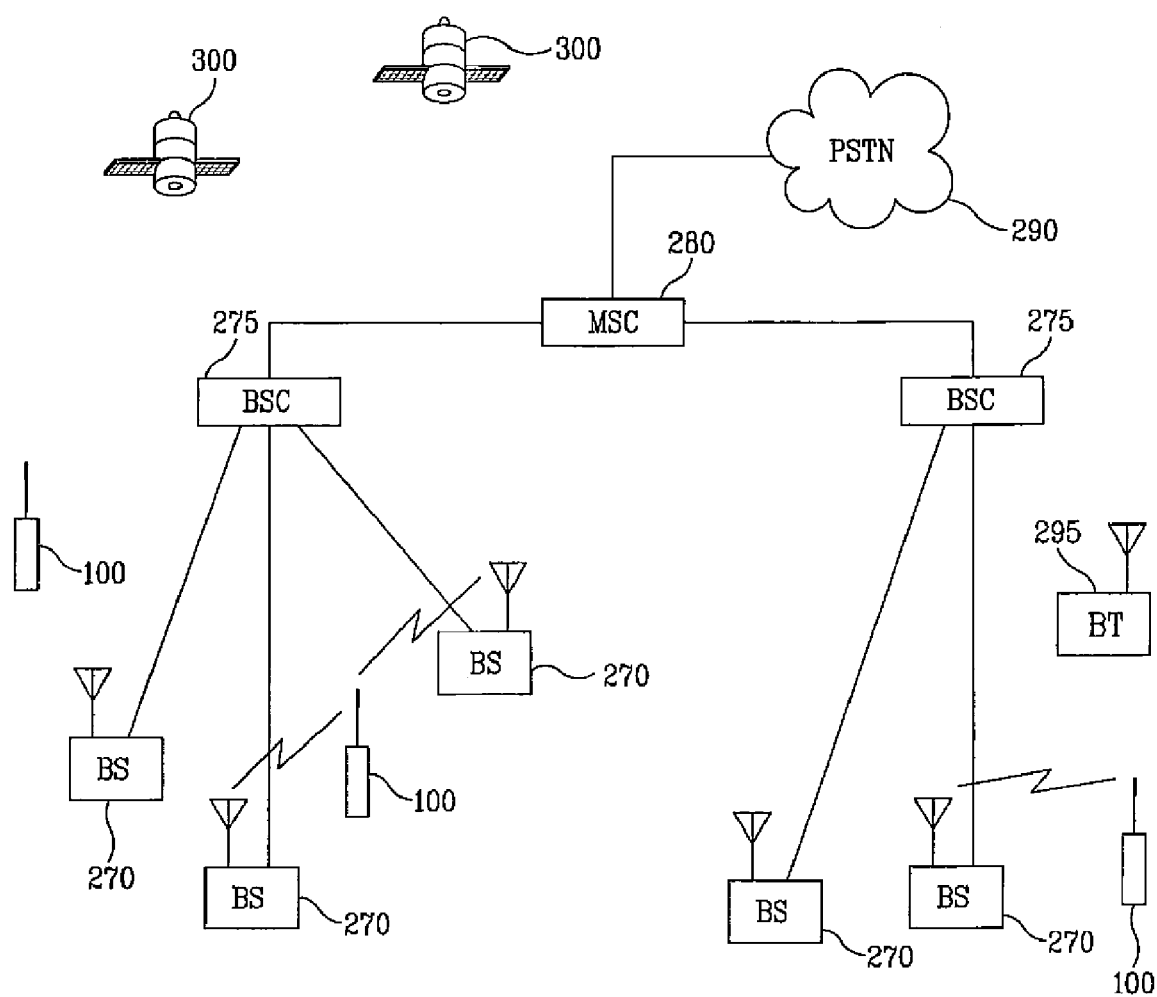
FIG. 4 is a block diagram of a CDMA wireless communication system operable with the mobile terminal of FIGS. 1-3B.

Referring now to FIG. 4, a CDMA wireless communication system is shown having a plurality of mobile terminals 100, a plurality of base stations 270, base station controllers (BSCs) 275, and a mobile switching center (MSC) 280. The MSC 280 is configured to interface with a public switch telephone network (PSTN) 290, and is also configured to interface with the BSCs 275. Further, the BSCs 275 are coupled to the base stations 270 via backhaul lines, which may be configured in accordance with any of several known interfaces including, for example, E1/T1, ATM, IP, PPP, Frame Relay, HDSL, ADSL, or xDSL. The communication system may also include more than two BSCs 275.

Further, each base station 270 may include one or more sectors, each sector having an omnidirectional antenna or an antenna pointed in a particular direction radially away from the base station 270. Alternatively, each sector may include two antennas for diversity reception. Each base station 270 may also be configured to support a plurality of frequency assignments, with each frequency assignment having a particular spectrum (e.g., 1.25 MHz, 5 MHz).

In addition, the intersection of a sector and frequency assignment may be referred to as a CDMA channel. The base stations 270 may also be referred to as base station transceiver subsystems (BTSS). In some instances, the term "base station" may be used to refer collectively to a BSC 275, and one or more base stations 270. The base stations 270 may also be denoted "cell sites." Alternatively, individual sectors of a given base station 270 may be referred to as cell sites.

A broadcasting transmitter 295 is also shown broadcasting to mobile terminals 100 operating within the system. The broadcast receiving module 111 (FIG. 1) of the portable mobile terminal is configured to receive broadcast signals transmitted by the broadcasting transmitter 295. Similar arrangements may be implemented for other types of broadcast and multicast signaling (as discussed above).

FIG. 4 further depicts several global positioning system (GPS) satellites 300. Such satellites 300 can be used to facilitate locating the position of some or all of the mobile terminals 100. Two satellites 300 are depicted, but useful positioning information may be obtained with greater or fewer satellites. The position-location module 115 (FIG. 1) of the mobile terminal 100 is also configured to cooperate with the satellites 300 to obtain desired position information. Other types of position detection technology, (i.e., location technology that may be used in addition to or instead of GPS location technology) may alternatively be implemented. Further, some or all of the GPS satellites 300 may alternatively or additionally be configured to provide satellite DMB transmissions.

In addition, during operation of the wireless communication system, the base stations 270 receive sets of reverse-link signals from various mobile terminals 100 that are engaging in calls, messaging, and other communications. Each reverse-link signal received by a given base station 270 is processed within that base station, and the resulting data is forwarded to an associated BSC 275.

The BSC 275 also provides call resource allocation and mobility management functionality including the orchestration of soft handoffs between base stations 270. The BSCs 275 also route the received data to the MSC 280, which provides additional routing services for interfacing with the PSTN 290. Similarly, the PSTN interfaces with the MSC 280, and the MSC interfaces with the BSCs 275, which in turn control the base stations 270 to transmit sets of forward-link signals to the mobile terminals 100.

Figure 5:
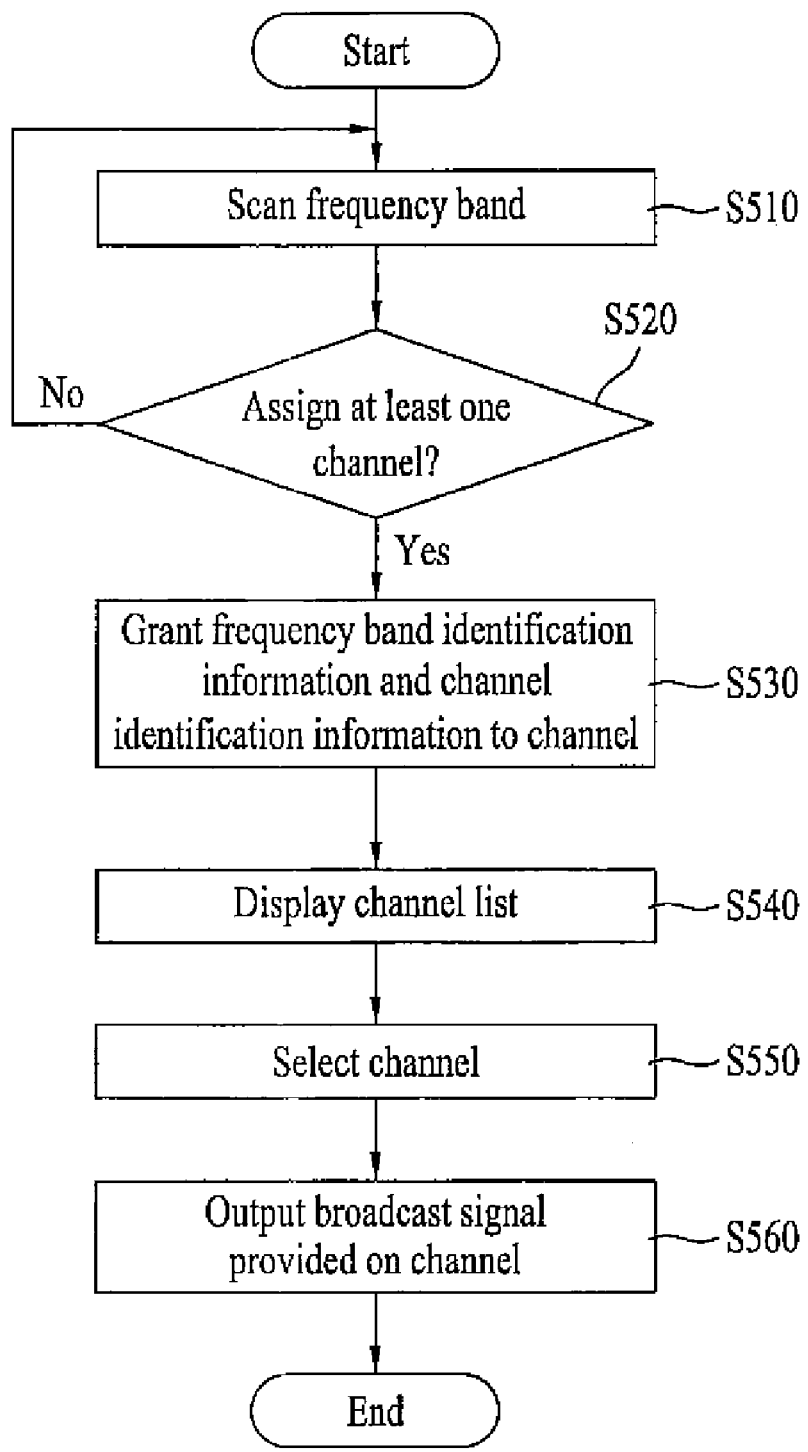
FIG. 5 is a first flowchart illustrating a method of displaying a channel in a mobile terminal according to one embodiment of the present invention.

Next, a channel displaying method in a mobile terminal according to an embodiment of the present invention will be explained with reference to the flowchart in FIG. 5. FIG. 1 will also be referred to throughout the specification. Referring to FIG. 5, if a user selects a menu item corresponding to a channel scan operation, the mobile terminal 100 scans at least one frequency band using the wireless communication unit 110, and more particularly, the broadcast receiving module 111 (S510). That is, the mobile terminal 100 scans for available frequency bands.

Further, the entire frequency bands assigned for broadcast signal transmission and reception are divided into at least one or more frequency bands and at least one channel can be assigned to each of the at least one or more frequency bands. In addition, the channel corresponds to a broadcast channel for a broadcast service provider (or a broadcast managing server operated by the broadcast service provider) to provide a broadcast signal to a mobile terminal.

Also, identification information ('frequency band identification information') for identifying each frequency band is set for the at least one frequency band. In more detail, in the DVB-T system, the frequency band is referred to as a 'channel' and the channel is referred to as a 'service'. The terms 'frequency band' and 'channel' are non-limiting examples and other terminologies having the same meanings can be used instead.

As a result of performing the scanning step S510, the mobile terminal 100 obtains information on an available frequency band (e.g., name, identification information of channel icon or the like, the number of assigned channels, etc.) or information on a channel assigned to an available frequency band (e.g., channel identification information, the number of channels assigned to the same frequency band, etc.).

Further, at least one of a number, text, symbol, name, icon and color, which are assigned to a frequency band, can be included in the frequency band identification information. In addition, at least one of a number, text, symbol, name, icon and color, which are assigned to a channel, can be included in the channel identification information.

The information obtained from the scanning step S510 can also be stored in the memory 160 according to a control signal of the controller 180. If the obtained information is different from previously stored information, the controller 180 can update the previously stored information based on the obtained information. Further, the scanning step S510 can be periodically or randomly performed irrespective of a presence or non-presence of a user's selection for a channel scan. The scanning step S510 may also not be performed in some instances.

In the following description, the identification number is divided into a unique number and a designated number. Further, the unique number and the designated number are represented as channel number 1 and channel number 2, respectively.

In the DVB-T system, because the entire frequency bands ranging between 470~862 MHz are divided by a unit of 8 MHz, a total of 49 frequency bands including 470 MHz~478 MHz (mean frequency 474 MHz), 478 MHz~486 MHz (mean frequency 482 MHz), 486 MHz~494 MHz (mean frequency 490 MHz), . . . 846 MHz~854 MHz (mean frequency 850 MHz) and 854 MHz~862 MHz (mean frequency 858 MHz) can be used. In particular, in the DVB-T system, a total of 49 frequency bands can be used by setting the frequency band to 8 MHz. Further, at least one channel can be assigned to each of the total of 49 frequency bands.

In addition, a unique number is assigned as an identification number for identifying a frequency band to each frequency band. For instance, the channel number 1 indicates a unique number uniquely assigned to a frequency band. Therefore, even if a channel assigned to a single frequency band is switched, the unique number remains intact. In more detail, for the channel number 1 shown in FIG. 6, a unique number 21 is assigned to 470 MHz~478 MHz, a unique number 22 is assigned to 478 MHz~486 MHz, a unique number 23 is assigned to 486 MHz~494 MHz, . . . , a unique number 68 is assigned to 846 MHz~854 MHz, and a unique number 69 is assigned to 854 MHz~862 MHz.

According to a presence or non-presence of availability of each of the frequency bands and a scan order, it is possible to assign a designated number corresponding to the frequency band or the unique number assigned to the frequency band. In one example, assume that a total of 49 frequency bands ranging from the frequency band 470 MHz~478 MHz to the frequency band 854 MHz~862 MHz are sequentially scanned.

Then, as an example for the channel number 2 shown in FIG. 6, the designated numbers 1 to 49 can be sequentially assigned to 470 MHz~478 MHz to 854 MHz~862 MHz (or unique numbers 21 to 69), respectively. Further, a designated number is not assigned to a frequency band that is unavailable as a result of the scan. For instance, when the 478 MHz~486 MHz band (or unique number 22) is not available, the designated number 2 is not assigned to any frequency band and the designated number 3 is assigned to the next frequency band 486 MHz~494 MHz.

As mentioned in the above description, the designated numbers can be set to 149. Also, a start number or an inter-number interval can be freely set according to a user selection. For instance, if a start number is 10 and if an inter-number interval is 2, the designated numbers 10, 12, 14 . . . 104 and 106 can be sequentially assigned to 470 MHz~478 MHz to 854 MHz~862 MHz, respectively.

In addition, the mobile terminal 100 obtains the unique or designated numbers per the frequency band as the frequency band scan result. The unique or designated numbers per the frequency band can also be previously stored in the memory 160.

Thus, in the scanning step S510, the mobile terminal 100 scans all frequency bands. The mobile terminal 100 can also perform a scan operation on a specific frequency band selected by a user (or a frequency band corresponding to an identification number). In addition, when a frequency band available per region or its identification number is stored in the memory 160, the mobile terminal 100 is able to perform a scan operation on an available frequency band in a currently located region.

For the predetermined number of channels with reference to a preference (favorite), view rate, signal reception, use period/frequency or the like, the mobile terminal 100 is able to selectively scan a frequency band to which the corresponding channels are assigned.

Referring again to FIG. 5, the mobile terminal 100 determines whether at least one channel is assigned to each of the at least one or more frequency bands available as a result of the scan in the scanning step S510 (S520). The determining step S520 can be performed by the controller 180.

As mentioned in the above description, at least one channel can be assigned to at least one frequency band. Thus, as a result of performing the scanning step S510, information on a presence or non-presence of channel assignment per frequency band and information of the assigned channel can be obtained. Therefore, the mobile terminal 100 is able to perform the determining step S520 using the obtained information.

As a result of performing the determining step S520, and when at least one or more channels are included in a prescribed frequency band (Yes in S520), the mobile terminal 100 grants or names frequency band identification information and channel identification information to each of the at least one or more channels (S530). In addition, the frequency band identification information corresponds to information for identifying each of the at least one or more frequency bands.

Further, the channel identification information corresponds to information for identifying each of the at least one or more channels assigned to the same frequency band. For instance, the number assigned to the frequency band in the frequency band identification information can include a unique number to a frequency band (the channel number 1 in FIG. 6) or a designated number (the channel number 2 in FIG. 6) to the frequency band. The number assigned to the channel in the channel identification number can also include the number sequentially assigned in a search order of the at least one channel.

Therefore, despite the same channel being assigned to the same frequency band, a different number can be assigned according to the search order. For instance, if the frequency band identification information on a specific channel is '21' and if the channel identification information thereon is '1', the mobile terminal 100 can grant 'AAA-a1' to the specific channel.

In addition, as a result of performing the determining step S520, if at least one channel is not included in a prescribed frequency band, the mobile terminal 100 returns to the scanning step S510 and then scans a frequency band in a next order. Further, the granting step S530 can be performed by the controller 180 using the frequency band identification information or the channel identification information stored in the memory 160.

Subsequently, the mobile terminal 100 displays a channel list including at least one channel assigned to each of the at least one or more frequency bands via the display 151 (S540). Also, the frequency band identification information and the channel identification information granted to each of the at least one or more channels can be displayed together with the channel list.

In addition, prior to performing the displaying step S540, the mobile terminal 100 can designate a frequency band or channel according to a user selection via the user input unit 130. In this instance, the information on the at least one channel assigned to the designated frequency band or the information on the designated channel is stored in the memory 160 of the mobile terminal 100.

For instance, when a user selects a menu item corresponding to a channel designation, the mobile terminal 100 displays a frequency band identification information list or a channel list and enables the user to designate specific frequency band identification information from the displayed frequency band identification information list or a specific channel from the channel list. Thus, in the displaying step S540, the mobile terminal 100 can display the channel list including channels assigned to the frequency band corresponding to the designated frequency band identification information or the designated channels.

The displaying step S540 will now be explained in more detail. Further, the frequency band identification information or channel identification will be referred to as 'identification information'.

FIGS. 7A to 7E are overviews of display screens illustrating a first screen configuration for displaying a channel list in the mobile terminal 100. In addition, the frequency band identification information is the 'unique number of the frequency band' (the channel number 1 in FIG. 6) and the channel identification information is a sequential number according to channel search order. Thus, the mobile terminal 100 is able to display a channel list including channels having unique numbers and sequential numbers assigned thereto as identification informations on the channels, respectively.

For instance, as shown in FIG. 7A, if the unique numbers of the frequency bands are 21, 23, 26 and 29, respectively, the controller 180 displays the identification information "21-1", "21-2" and "21-3" on three channels assigned to the frequency band corresponding to the unique number 21, the identification information "23-1" and "23-2" on two channels assigned to the frequency band corresponding to the unique number 23, the identification information "26-1" and "26-2" on two channels assigned to the frequency band corresponding to the unique number 26, and the identification information "29-1" and "29-2" on two channels assigned to the frequency band corresponding to the unique number 29 on the channel list. In addition, the channel names can be displayed as broadcast information on the respective channels can be displayed together.

Referring to FIG. 7B, the frequency band identification information is a name assigned to a frequency band and the channel identification information is a sequential number according to channel search order. Hence, by replacing the unique numbers "21", "23", "26" and "29" on the screen shown in FIG. 7A, the names 'AAA', 'BBB', 'CCC' and 'DDD' of frequency bands corresponding to the unique numbers "21", "23", "26" and "29" are displayed.

Figure 7C:
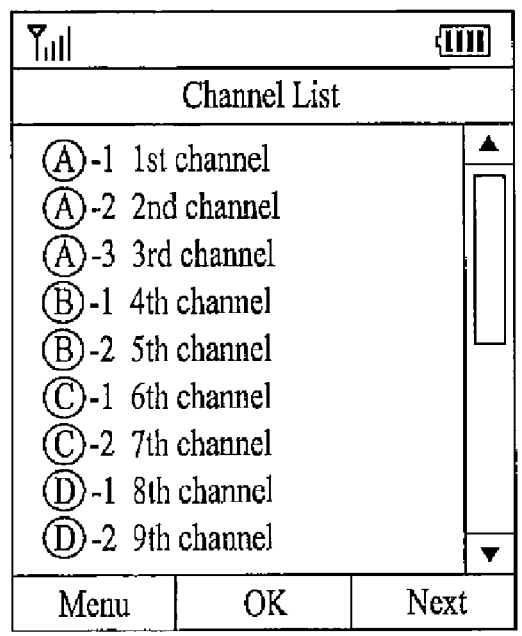

Referring to FIG. 7C, the frequency band identification information is an icon allocated to a frequency band and the channel identification information is a sequential number according to the channel search order. That is, by replacing the unique numbers "21", "23", "26" and "29" on the screen shown in FIG. 7A, icons A, B, C and D corresponding to the unique numbers "21", "23", "26" and "29", respectively, are displayed.

Figure 7D:
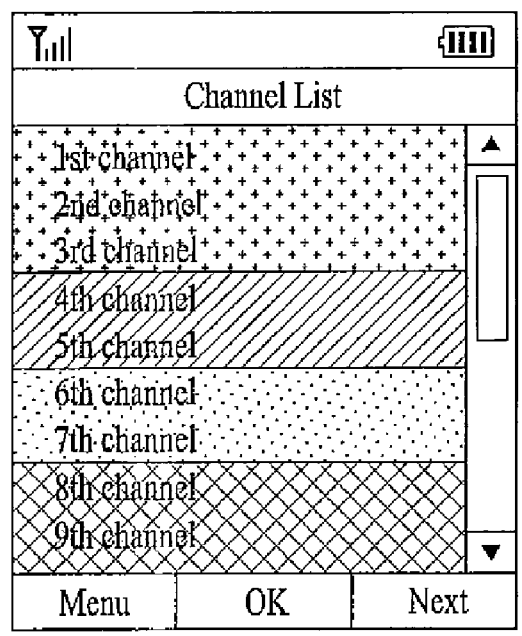

Referring to FIG. 7D, the frequency band identification information is a background color/background pattern allocated to a frequency band and the channel identification information is a sequential number according to channel search order. For example, FIG. 7D illustrates an example in which the first to third channels are assigned to a first frequency band, the fourth and fifth channels are assigned to a second frequency band, the sixth and seventh channels are assigned to a third frequency band, and the eighth and ninth channels are assigned to a fourth frequency band. Also, in this example, the colors red, orange, yellow and green are assigned to the first to fourth frequency bands, respectively.

The mobile terminal 100 is also able to display the first to third channels assigned to the first frequency band in a background color red, the fourth and fifth channels assigned to the second frequency band in a background color orange, the sixth and seventh channels assigned to the third frequency band in a background color yellow, and the eight and the ninth channels assigned to the fourth frequency band in a background color green on the channel list.

Figure 7E:
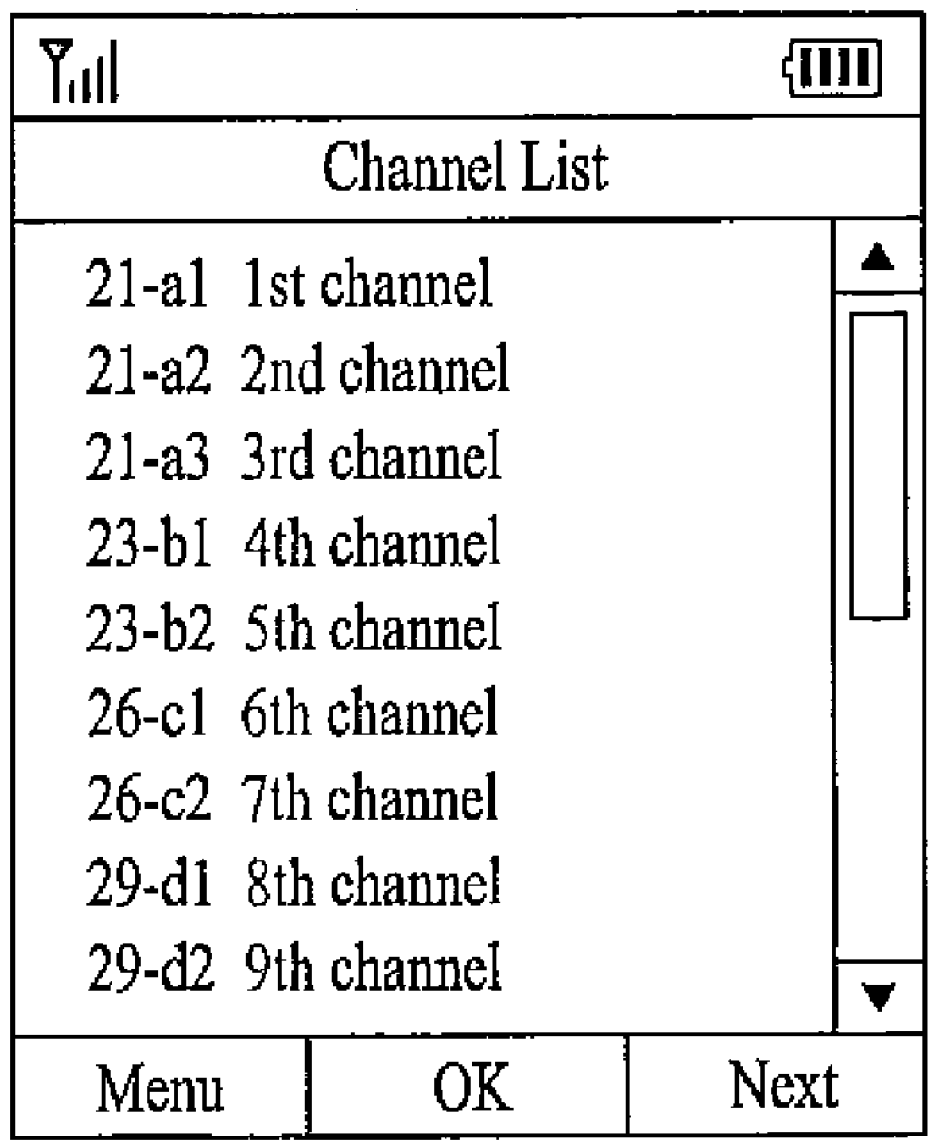

Referring to FIG. 7E, the frequency band identification information is the unique number of the frequency band and the channel identification number is a character (text) allocated to a channel. Thus, by replacing the sequential numbers according to the channel search order on the screen shown in FIG. 7A, text allocated to each channel can be displayed.

For instance, in the DVB-T system, the text allocated to the channel can include a 'service ID'. In this example, all channels can have different service IDs or channels assigned to the same frequency band can have different service IDs only.

Figure 8A:
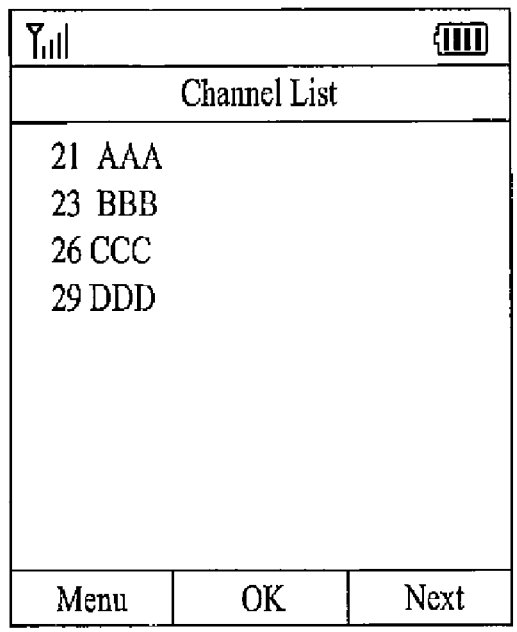
FIGS. 8A to 8C are overviews of display screens illustrating a second screen configuration for displaying a channel list in a mobile terminal according to one embodiment of the present invention.
Figure 8B:
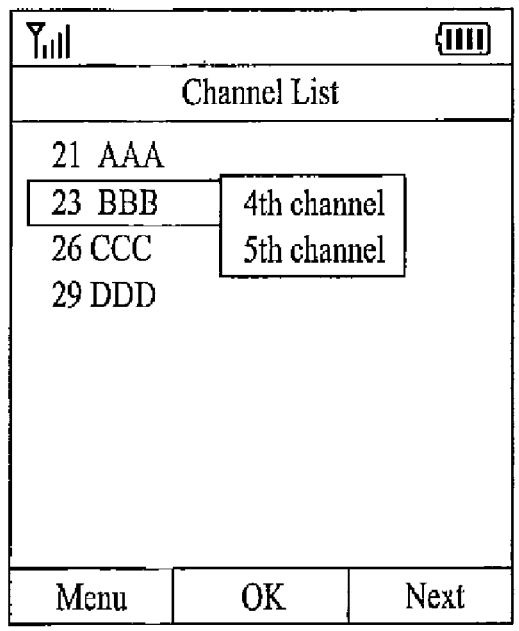
Figure 8C:
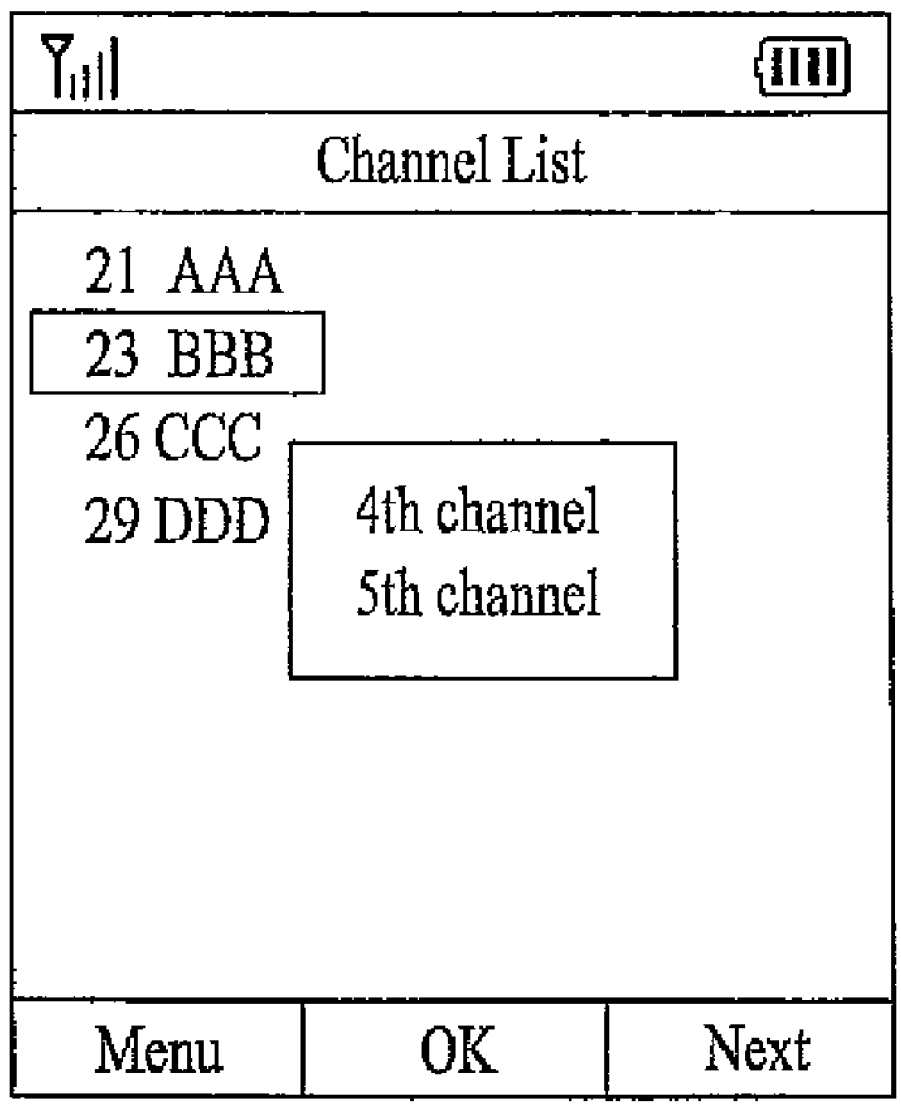

Next, FIGS. 8A to 8C are overviews of display screens illustrating a second screen configuration for displaying a channel list in the mobile terminal 100. In the following description, the frequency band identification information is limited to a name allocated to a frequency band (hereinafter called 'frequency band name').

Referring to FIG. BA, if a user selects a menu item corresponding to a 'channel list view' option, the mobile terminal 100 displays a list including at least one or more frequency band names. Then, if the user selects the frequency band name 'BBB' in FIG. 8A, the mobile terminal 100 displays a list including at least one or more channels assigned to a frequency band corresponding to the frequency band name 'BBB' (see FIGS. 8B and 8C).

In particular, referring to FIG. 8B, if the user selects the frequency band name 'BBB', the mobile terminal 100 displays a channel list including fourth and fifth channels assigned to the frequency band corresponding to the frequency band name 'BBB' on a prescribed area of the screen using a tree system. Alternatively, and referring to FIG. 8C, if the user selects the frequency band name 'BBB', the mobile terminal 100 displays a channel list including the fourth and fifth channels assigned to the frequency band corresponding to the frequency band name 'BBB' on a prescribed area of the screen using a popup system.

Optionally, if a specific frequency band name is selected, the mobile terminal 100 can display a channel list including at least one or more channels assigned to a frequency band corresponding to the selected frequency band name using one of a PIP (picture in picture) system, a ticker system, an overlay system, an OSD (on screen display) system and the like. Further, the above descriptions of FIGS. 7A to 8C are applicable to a broadcast outputting mode.

Next, FIGS. 9A and 9B are overviews of displays screen illustrating a screen configuration for displaying a subchannel list in the mobile terminal 100 in a broadcast outputting mode. In the following description, the first to fourth frequency bands corresponding to unique numbers '21', '23', '26' and '29' are selectable, respectively.

Referring to FIG. 9A, a user can select a menu item corresponding to a 'channel list view' while the mobile terminal 100 is outputting a broadcast (FIG. 9A(a)). The mobile terminal 100 also displays a channel list including channels assigned to the same frequency band of a currently viewed channel '21-1' on a prescribed area of the screen (FIG. 9A(b)).

Referring to FIG. 9B, while outputting a broadcast signal provided on a prescribed one of at least one or more channels provided to a first frequency band, the mobile terminal 100 can display a direction key for enabling a user to select a channel on a prescribed area of the screen (FIG. 9B(a). If the user selects the right direction key in FIG. 9B(a), the mobile terminal 100 displays a channel list including fourth and fifth channels assigned to a second frequency band next to the first frequency band on a prescribed area of the screen according to a unique number incrementing order (FIG. 9B(b)).

If the user selects the left direction key in FIG. 9B(a), the mobile terminal 100 displays a channel list including eighth and ninth channels assigned to a fourth frequency band behind the first frequency band on a prescribed area of the screen according to a unique number decrementing order (e.g., corresponding to a largest unique number when a smallest unique number is currently selected) (FIG. 9B(c)).

In addition, to correspond to a selection count or duration of the direction key, a frequency band located at a predetermined position from a current frequency band is selected according to the unique number incrementing or decrementing order. Then, a channel list including channels assigned to the selected frequency band can be displayed.

For instance, if the right direction key is selected twice, the third frequency band located second next to the first frequency band is selected according to the unique number incrementing order. A channel list including channels assigned to the third frequency band can then be displayed.

Optionally, a title of a currently provided broadcast program, a title of a previous/next broadcast program, broadcast organization information, information on a broadcast program (e.g., broadcast time, character information, synopsis information, etc.) can be provided as broadcast information on a channel. In addition, a designated number (the channel number 2 in FIG. 6) of a frequency band can be used as frequency band identification information.

Referring again to FIG. 5, a prescribed channel is selected from the channel list displayed in the displaying step S540 (S550). In addition, the mobile terminal 100 is able to select the channel to correspond to a user selection operation performed via the user input unit 130. Subsequently, the mobile terminal 100 receives a broadcast signal on the channel selected in the selecting step S550 via the wireless communication unit 110, and more particularly, via the broadcast receiving module 111 and then outputs the received broadcast signal via the output unit 150 (S560).

The selecting step S550 and the outputting step S560 will now be explained in more detail. FIGS. 10 and 11 are overviews of display screens illustrating a screen configuration for selecting a channel and a screen configuration for outputting a broadcast signal provided on the selected channel in the mobile terminal 100.

Referring to FIG. 10, if a specific channel is selected from a channel list FIG. 10(a)), the mobile terminal 100 outputs a broadcast signal provided on the selected specific channel (FIG. 10(b)). Referring to FIG. 11, the mobile terminal 100 selects a channel from a channel list by a frequency band unit. In this example, the first to fourth frequency bands correspond to unique numbers 21, 23, 26 and 29, respectively.

In particular, referring to FIGS. 11(a) and (b), to correspond to a user selection operation via the user input unit 130, the first to third channels assigned to a first frequency band are selected or both the fourth and fifth channels assigned to a second frequency band can be selected.

Referring to FIG. 11(c), the mobile terminal 100 can output a broadcast signal provided on a specific channel selected by a user from the channels selected in FIGS. 11(a) or (b) or a specific channel (e.g., a representative channel, user-specific channel, a favorite channel, a channel having high use frequency/quantity, etc.) that meets a prescribed reference among currently selected channels.

Next, FIGS. 12A to 12C are overviews of display screens illustrating a screen configuration for selecting a channel using a navigation key in a broadcast outputting mode and a screen configuration for displaying an output mode of a broadcast signal provided on the selected channel in the mobile terminal 100. In this example, the first to fourth frequency bands correspond to unique numbers 21, 23, 26 and 29, respectively.

Referring to FIG. 12A, when a broadcast signal provided on a specific one of channels assigned to a first frequency band is output, the mobile terminal 100 can display a direction key for receiving a channel selection from a user on a prescribed area of the screen. Referring to FIG. 12B, if the user selects the right direction key in FIG. 12A, the mobile terminal 100 selects a channel located next to the specific channel among channels assigned to from the first to the fourth frequency bands and then outputs a broadcast signal provided on the selected channel (FIG. 12B(a)).

If the user selects the left direction key in FIG. 12A, the mobile terminal 100 selects a channel located previous to the specific channel among the channels assigned to from the first to the fourth frequency bands and then outputs a broadcast signal provided on the selected channel (FIG. 12B(b)).

Referring to FIG. 12C, if the user selects the right direction key in FIG. 12A, the mobile terminal 100 selects a representative channel from channels assigned to a second frequency band located next to the first frequency band and then outputs a broadcast signal provided on the selected channel (FIG. 12C(a)).

If the user selects the left direction key in FIG. 12A, the mobile terminal 100 selects a representative channel from channels assigned to a fourth frequency band located previous to the first frequency band and then outputs a broadcast signal provided on the selected channel (FIG. 12C(b)). Further, in FIG. 12C, instead of the representative channel, a channel can be selected from a user-specific channel, a favorite channel, a channel having a large use quantity, a channel having a high popularity rating and a recently entered channel.

Figure 13:
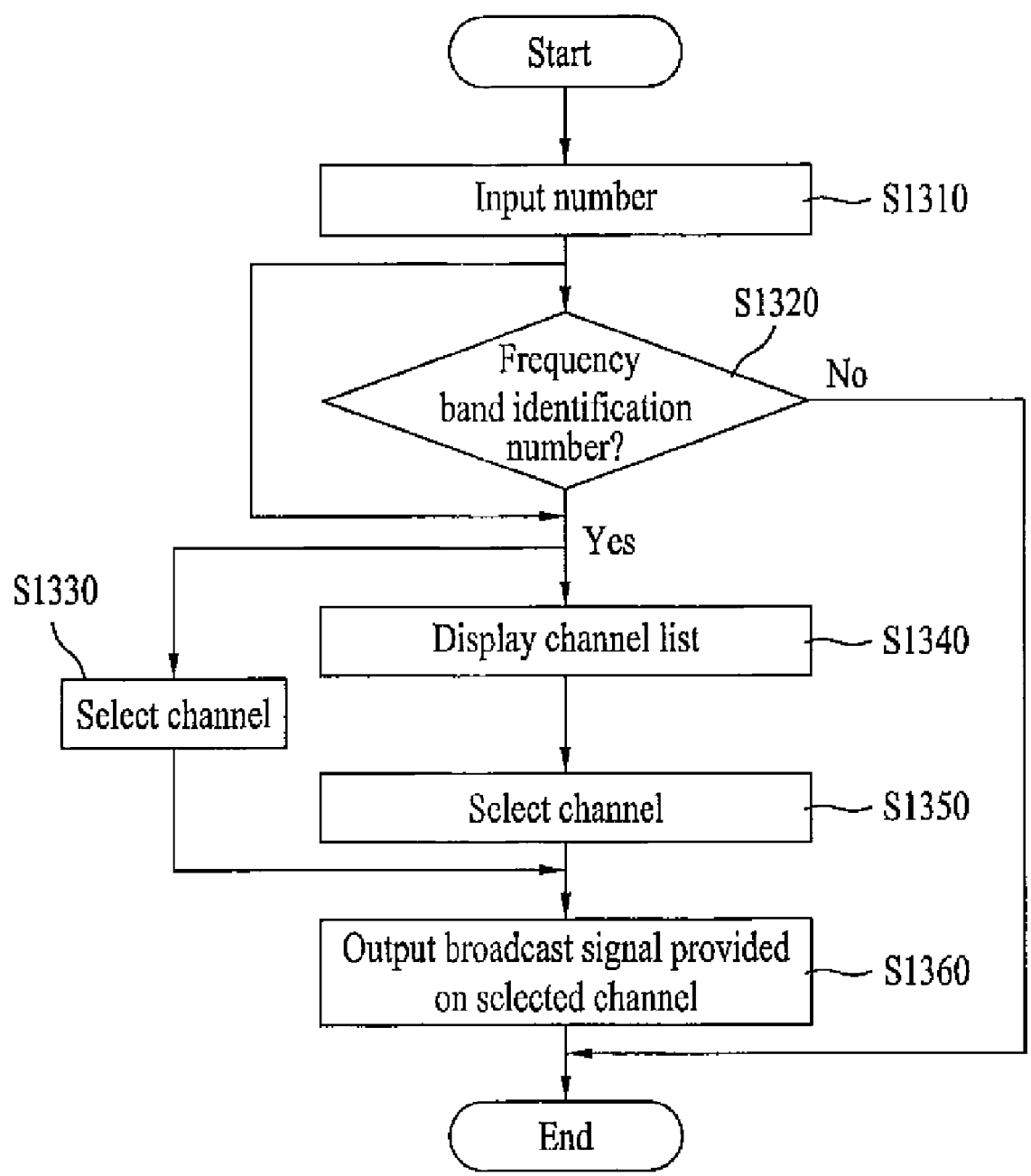
FIG. 13 is a second flowchart illustrating a method of displaying a channel in a mobile terminal according to one embodiment of the present invention.

Next, a method of displaying a channel in a mobile terminal according to an embodiment of the present invention will be explained with reference to the flowchart in FIG. 13. Referring to FIG. 13, a number corresponding to a user input operation is input to the mobile terminal 100 via the user input unit 130 (S1310). For instance, a user can input a number by selecting a numeral key or by writing digit(s) on the touchscreen.

The mobile terminal 100 then determines whether the number input in the inputting step S510 matches a frequency band identification number (S1320). Further, the frequency band identification number is an example of frequency band identification information and includes the above-mentioned unique or designated number of the frequency band.

If the number input in the inputting step S1310 matches the frequency band identification number (Yes in S1320), the mobile terminal 100 selects a prescribed channel from the channels assigned to the frequency band for which the frequency band identification number is set to the number input in the inputting step S1310 (S1330).

In addition, the mobile terminal 100 can perform the selecting step S1330 irrespective of a channel selection operation made by a user. For instance, in the selecting step S1330, the mobile terminal 100 can select a prescribed channel from a user-designated channel, a representative channel, a favorite channel, a channel having a frequent use, a channel having a high popularity rating and a recently entered channel.

Alternatively, when the number input in the inputting step S1310 matches the frequency band identification number, the mobile terminal 100 can display a channel list including channels assigned to a frequency band for which the frequency band identification number is set to the number input in the inputting step S1310 via the display 151 (S1340).

A specific channel can be selected from the channel list displayed in the displaying step S1340 and is then inputted to the mobile terminal (S1350). Subsequently, the mobile terminal 100 receives a broadcast signal provided on the specific channel selected in the selecting step S1330 or S1350 and is then able to output the received broadcast signal (S1360).

The process for selecting the specific channel from the channels assigned to the frequency band, for which the frequency band identification number is set to the input number, will now be explained in more detail with reference to FIGS. 14A and 14B.

Referring to FIG. 14A, if the user sequentially inputs the digits '2' and '3' via the user input unit 130 (FIG. 14A(a)), the mobile terminal 100 selects a representative channel from channels assigned to a frequency band, for which a frequency band identification number is set to '23', and is then able to output a broadcast signal provided on the selected representative channel (FIG. 14A(b)).

Referring to FIG. 14B, if the user sequentially inputs the digits '2' and '3' via the user input unit 130, the mobile terminal 100 displays a channel list including channels assigned to a frequency band for which a frequency band identification number is set to '23' (FIG. 14B(a)). If the user selects a specific channel from the channel list displayed in FIG. 14B(a), the mobile terminal 100 outputs a broadcast signal provided on the specific channel selected by the user (FIG. 14B(b)).

Referring again to FIG. 13, the mobile terminal 100 selects one from at least one or more channels to which a frequency band identification number or a channel identification number corresponding to the number inputted in the inputting step S1310 is granted (S1330). Further, the channel identification number can include the number attached to each channel sequentially according to a search order of a plurality of channels assigned to each of at least one or more frequency bands.

In addition, the channel identification number can be regarded as an example for channel identification information. For instance, in the selecting step S1330, the mobile terminal 100 can select a prescribed channel from a user-designated channel, a representative channel, a favorite channel, a channel having a frequent use, a channel having a high popularity rating and a recently entered channel.

Further, the mobile terminal 100 can display a channel list including at least one channel to which a frequency band identification number or a channel identification number corresponding to the number input in the inputting step S1310 is granted (S1340). Also, the mobile terminal 100 enables a specific channel to be selected from the channel list displayed in the displaying step S1340 (S1360).

The process for selecting the specific channel to which the frequency band identification number or the channel identification number corresponding to the input number will now be explained in more detail with reference to the display screens shown in FIG. 15.

Referring to FIG. 15(a), if the user inputs a digit '2' via the user input unit 130, the mobile terminal 100 displays a channel list including all channels assigned to frequency bands for which frequency band identification numbers containing the digit '2' are set. If the user sequentially inputs the digits '2' and '3' in FIG. 15(a), the mobile terminal 100 displays a channel list including all channels assigned to the frequency band for which the frequency band identification number is set to '23' (FIG. 15(b)).

Then, if the user selects a specific channel from the channel list displayed in FIGS. 15(a) or (b), the mobile terminal 100 displays a broadcast signal provided on the selected specific channel (FIG. 15(c)). Further, if the input number matches a frequency band identification number set for a specific frequency band, the mobile terminal 100 selects a representative channel from channels assigned to the specific frequency band and is then able to output a broadcast signal provided on the selected representative channel (FIG. 15(d)).

If the user sequentially inputs the digits '2', '3', and '1', the mobile terminal 100 selects a specific channel, to which '23' and '2' are granted as a frequency band identification number and a channel identification number, respectively, and outputs a broadcast signal provided on the selected specific channel (FIG. 15(d)). Further, in this example, the frequency band identification number is constructed with two digits.

In addition, if a frequency band identification number is a 1-digit number, a specific channel to which '2' and '31' are granted as a frequency band identification number and a channel identification number, respectively can be selected. If a frequency band identification number is a 3-digit number, a list of channels assigned to a frequency band to which '231' is granted as a frequency band identification number or is able to automatically a representative channel from the list can be displayed.

In addition, the above-described method of displaying a channel in a mobile terminal can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via the Internet). And, the computer can include the controller 180 of the terminal 100.

Accordingly, the present invention provides several advantages.

First, one embodiment of the present invention displays channels assigned per frequency band distinguishably, thereby raising a level of user's recognition on channels in a channel selection process.

Secondly, although a scan result varies according to a location change of a mobile terminal, a plurality of channels can be displayed distinguishably using frequency band identification information. Therefore, a user can always be provided with a channel list in which the same frequency band identification information is granted to the same frequency band.

Thirdly, a user can easily select a channel through a numeral key input.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising;
a wireless communication unit configured to scan for available frequency bands;
a controller configured to assign a frequency band identification information to each available frequency band and to assign channel identification information to each channel included in a corresponding available frequency band; and
a display configured to display a channel list including the frequency band identification information and the channel identification information assigned to the each available frequency band and each channel included in the corresponding available frequency band respectively,
wherein the frequency band identification information and the channel identification information include a number allocated to the corresponding available frequency band and each channel included in the corresponding available frequency band,
wherein the number allocated to the corresponding available frequency band includes a unique number that is the same for each channel included in the corresponding available frequency band, and the unique number remains intact even if a channel assigned to a single frequency band is switched, and
wherein the controller is further configured to sequentially assign numbers to channels in the corresponding available frequency band based on a scan order of the channels in the corresponding available frequency band.

2. The mobile terminal of claim 1, wherein the controller is further configured to control the display to display a list of possible frequency band identification information and channel identification information that can be selected so as to be assigned by the controller to the available frequency band and each channel included in the corresponding available frequency band.

3. The mobile terminal of claim 1, wherein the controller is further configured to control the display to display a list of channels that have been scanned in a particular frequency band for a currently broadcast program corresponding to a prescribed channel in the particular frequency band being output.

4. The mobile terminal of claim 3, wherein the controller is further configured to control the display to display a list of forward and reverse channels in front of and behind the prescribed channel among the channels that have been scanned in the particular frequency band for the currently broadcast program being output in accordance with a forward direction and reverse direction channel input operation being performed on the mobile terminal, respectively.

5. The mobile terminal of claim 1, further comprising:
a user input unit configured to select multiple channels for a particular available frequency band included in the displayed channel list,
wherein the controller is further configured to select one channel from the selected multiple channels and to control the display to display a broadcast program corresponding to the selected one channel.

6. The mobile terminal of claim 5, wherein the controller is further configured to select the one channel from the selected multiple channels based on at least one of a user-designated channel, a representative channel, a favorite channel, a frequently watched channel, a channel having a high popularity rating and a recently entered channel.

7. The mobile terminal of claim 1, further comprising:
a user input unit configured to select one channel from forward and reverse channels located in front of and behind a channel of a currently output broadcast program,
wherein the controller is further configured to control the display to display a broadcast program corresponding to the selected channel in accordance with the channel selected on the user input unit.

8. The mobile terminal of claim 7, wherein the controller is further configured to control the display to display the broadcast program corresponding to a channel that is adjacent to the channel of the currently output broadcast program based on the selection of the forward and reverse channels on the user input unit, respectively.

9. The mobile terminal of claim 7, wherein the controller is further configured to control the display to display a broadcast program that is on a channel in a frequency band adjacent to a frequency band of the currently output broadcast program based on the selection of the forward and reverse channels on the user input unit, respectively.

10. The mobile terminal of claim 1, further comprising:
a user input unit configured to input desired frequency band identification information,
wherein the controller is further configured to compare the input desired frequency band identification information with the assigned frequency band identification information, and to control the display unit to display a broadcast program corresponding to a prescribed channel included in a frequency band corresponding to the input desired frequency band identification information or to display a channel list including channels available in the frequency band corresponding to the input desired frequency band identification information based on a result of the comparison.

11. A method of controlling a mobile terminal, the method comprising:
scanning for available frequency bands;
assigning a frequency band identification information to each available frequency band and assigning channel identification information to each channel included in a corresponding available frequency band; and
displaying a channel list including the frequency band identification information and the channel identification information assigned to the corresponding available frequency band and each channel included in the corresponding available frequency band respectively,
wherein the frequency band identification information and the channel identification information include a number allocated to the corresponding available frequency band and each channel included in the corresponding available frequency band,
wherein the number allocated to the corresponding available frequency band includes a unique number that is the same for each channel included in the corresponding available frequency band, and the unique number remains intact even if a channel assigned to a single frequency band is switched, and
wherein the assigning step further comprises sequentially assigning numbers to channels in the corresponding available frequency band based on a scan order of the channels in the corresponding available frequency band.

12. The method of claim 11, wherein the displaying step further comprises displaying a list of possible frequency band identification information and channel identification information that can be selected so as to be assigned by the assigning step to the available frequency band and each channel included in the corresponding available frequency band.

13. The method of claim 11, wherein the displaying step further comprises displaying a list of channels that have been scanned in a particular frequency band for a currently broadcast program corresponding to a prescribed channel in the particular frequency band being output.

14. The method of claim 13, wherein the displaying step further comprises displaying a list of forward and reverse channels in front of and behind the prescribed channel among the channels that have been scanned in the particular frequency band for the currently broadcast program being output in accordance with a forward direction and reverse direction channel input operation being performed on the mobile terminal, respectively.

15. The method of claim 11, further comprising:
selecting multiple channels for a particular available frequency band included in the displayed channel list; and
selecting one channel from the selected multiple channels and displaying a broadcast program corresponding to the selected one channel.

16. The method of claim 15, wherein the selecting step selects the one channel from the selected multiple channels based on at least one of a user-designated channel, a representative channel, a favorite channel, a frequently watched channel, a channel having a high popularity rating and a recently entered channel.

17. The method of claim 11, further comprising:
selecting one channel from forward and reverse channels located in front of and behind a channel of a currently output broadcast program; and
displaying a broadcast program corresponding to the selected channel.

18. The method of claim 17, wherein the step of displaying the broadcast program displays the broadcast program corresponding to a channel that is adjacent to the channel of the currently output broadcast program based on the selection of the forward or reverse channels, respectively.

19. The method of claim 17, wherein the step of displaying the broadcast program displays the broadcast program that is on a channel in a frequency band adjacent to a frequency band of the currently output broadcast program based on the selection of the forward and reverse channels, respectively.

20. The method of claim 11, further comprising:
inputting desired frequency band identification information;
comparing the input desired frequency band identification information with the assigned frequency band identification information; and
displaying a broadcast program corresponding to a prescribed channel included in a frequency band corresponding to the input desired frequency band identification information or displaying a channel list including channels available in the frequency band corresponding to the input desired frequency band identification information based on a result of the comparing step.

* * * * *